(12) United States Patent
Mathai et al.

(10) Patent No.: US 10,108,969 B2
(45) Date of Patent: Oct. 23, 2018

(54) METHOD AND SYSTEM FOR PROVIDING PERSONALIZED ONLINE SERVICES AND ADVERTISEMENT IN PUBLIC SPACES

(75) Inventors: Tom J. Mathai, San Francisco, CA (US); Kenneth Margon, Oakland, CA (US)

(73) Assignee: Streetspace, Inc., Torrance, CA (US)

(*) Notice: Subject to any disclaimer, the term of this patent is extended or adjusted under 35 U.S.C. 154(b) by 1577 days.

(21) Appl. No.: 12/189,540

(22) Filed: Aug. 11, 2008

(65) Prior Publication Data

US 2008/0301264 A1    Dec. 4, 2008

Related U.S. Application Data

(62) Division of application No. 10/922,160, filed on Aug. 20, 2004, which is a division of application No.
(Continued)

(51) Int. Cl.
*G06Q 30/02* (2012.01)
*G06Q 30/04* (2012.01)
(Continued)

(52) U.S. Cl.
CPC ......... *G06Q 30/02* (2013.01); *G06Q 30/0242* (2013.01); *G06Q 30/0267* (2013.01);
(Continued)

(58) Field of Classification Search
CPC .................................................. G06Q 30/02
(Continued)

(56) References Cited

U.S. PATENT DOCUMENTS 5,121,503 A   6/1992   Davis
5,220,593 A   6/1993   Zicker et al.
(Continued)

FOREIGN PATENT DOCUMENTS

JP   09-153054   6/1997
JP   10-074206   3/1998
JP   11-15840    1/1999

OTHER PUBLICATIONS

Caf Society faces change as the Internet goes public, Sarah Marriott looks at the future of cybercafs: [City Edition]. (Aug. 24, 1998). Irish Times Retrieved from https://dialog.proquest.com; (Year: 1998).*
(Continued)

*Primary Examiner* — Eric R Netzloff
*Assistant Examiner* — Michael R Stibley
(74) *Attorney, Agent, or Firm* — San Diego IP Law Group LLP; Trevor Coddington

(57) ABSTRACT

A method and system for providing personalized and integrated online services for communications and commercial transactions both in private and public venues. The invention provides personalized information that is conveniently accessible through a network of public access stations (or terminals) which are enabled by a personal system access card (e.g., smart card). The invention also provides advertisers the opportunity to directly engage actual and potential user-consumers with selected advertising or marketing content based on each user's profile and usage history.

1 Claim, 15 Drawing Sheets

Related U.S. Application Data

09/959,654, filed as application No. PCT/US00/11840 on May 3, 2000, now Pat. No. 6,847,969.

(60) Provisional application No. 60/132,168, filed on May 3, 1999, provisional application No. 60/160,760, filed on Oct. 21, 1999.

(51) Int. Cl.
  *G07F 17/00* (2006.01)
  *G07F 17/16* (2006.01)
  *G06Q 40/00* (2012.01)

(52) U.S. Cl.
  CPC ..... *G06Q 30/0273* (2013.01); *G06Q 30/0277* (2013.01); *G06Q 30/04* (2013.01); *G06Q 40/12* (2013.12); *G07F 17/0014* (2013.01); *G07F 17/16* (2013.01); *Y10S 707/99932* (2013.01); *Y10S 707/99933* (2013.01); *Y10S 707/99935* (2013.01)

(58) Field of Classification Search
  USPC ........................................................ 705/14
  See application file for complete search history.

(56) References Cited

U.S. PATENT DOCUMENTS

| | | | |
|---|---|---|---|
| 5,408,417 A | 4/1995 | Wilder | |
| 5,508,731 A | 4/1996 | Kohorn | |
| 5,537,343 A | 7/1996 | Kikinis et al. | |
| 5,542,420 A | 8/1996 | Goldman et al. | |
| 5,665,951 A | 9/1997 | Newman et al. | |
| 5,673,322 A | 9/1997 | Pepe et al. | |
| 5,717,923 A | 2/1998 | Dedrick | |
| 5,754,939 A | 5/1998 | Herz et al. | |
| 5,761,662 A | 6/1998 | Dasan | |
| 5,781,894 A | 7/1998 | Petrecca et al. | |
| 5,794,210 A * | 8/1998 | Goldhaber | G06Q 30/0207 705/14.69 |
| 5,796,393 A * | 8/1998 | MacNaughton et al. | 715/733 |
| 5,796,952 A | 8/1998 | Davis et al. | |
| 5,812,765 A | 9/1998 | Curtis | |
| 5,819,284 A | 10/1998 | Farber et al. | |
| 5,835,087 A | 11/1998 | Herz | |
| 5,839,088 A | 11/1998 | Hancock et al. | |
| 5,848,396 A | 12/1998 | Gerace | |
| 5,848,397 A | 12/1998 | Marsh et al. | |
| 5,857,175 A | 1/1999 | Day et al. | |
| 5,872,850 A | 2/1999 | Klein et al. | |
| 5,884,284 A | 3/1999 | Peters et al. | |
| 5,884,322 A | 3/1999 | Sidhu et al. | |
| 5,902,353 A | 5/1999 | Reber et al. | |
| 5,907,837 A | 5/1999 | Ferrel et al. | |
| 5,948,040 A | 9/1999 | DeLorme et al. | |
| 5,948,061 A * | 9/1999 | Merriman et al. | 709/219 |
| 5,951,300 A | 9/1999 | Brown | |
| 5,953,505 A | 9/1999 | Chida | |
| 5,968,117 A | 10/1999 | Schuetze | |
| 5,987,430 A | 11/1999 | Van Horne et al. | |
| 6,006,252 A | 12/1999 | Wolfe | |
| 6,009,410 A | 12/1999 | LeMole et al. | |
| 6,026,368 A | 2/2000 | Brown et al. | |
| 6,047,327 A | 4/2000 | Tso et al. | |
| 6,052,629 A * | 4/2000 | Leatherman | G06Q 30/0601 700/216 |
| 6,078,928 A | 6/2000 | Schnase et al. | |
| 6,084,528 A | 7/2000 | Beach et al. | |
| 6,091,956 A * | 7/2000 | Hollenberg | G06Q 30/02 455/456.5 |
| 6,119,098 A | 9/2000 | Guyot et al. | |
| 6,123,259 A | 9/2000 | Ogasawara | |
| 6,129,274 A | 10/2000 | Suzuki | |
| 6,134,532 A | 10/2000 | Lazarus et al. | |
| 6,141,010 A | 10/2000 | Hoyle | |
| 6,195,651 B1 | 2/2001 | Handel et al. | |
| 6,199,067 B1 | 3/2001 | Geller | |
| 6,202,023 B1 | 3/2001 | Hancock et al. | |
| 6,266,649 B1 | 7/2001 | Linden et al. | |
| 6,275,811 B1 | 8/2001 | Ginn | |
| 6,317,718 B1 | 11/2001 | Fano | |
| 6,327,574 B1 | 12/2001 | Kramer et al. | |
| 6,332,127 B1 * | 12/2001 | Bandera et al. | 705/14.55 |
| 6,334,110 B1 | 12/2001 | Walter et al. | |
| 6,366,298 B1 | 4/2002 | Haitsuka et al. | |
| 6,368,177 B1 | 4/2002 | Gabai et al. | |
| 6,401,085 B1 | 6/2002 | Gershman et al. | |
| 6,438,545 B1 | 8/2002 | Beauregard et al. | |
| 6,446,076 B1 | 9/2002 | Burkey et al. | |
| 6,484,939 B1 | 11/2002 | Blaeuer | |
| 6,522,875 B1 | 2/2003 | Dowling et al. | |
| 6,549,937 B1 * | 4/2003 | Auerbach | H04L 29/06 709/206 |
| 6,549,939 B1 | 4/2003 | Ford et al. | |
| 6,560,639 B1 | 5/2003 | Dan et al. | |
| 6,567,850 B1 | 5/2003 | Freishtat et al. | |
| 6,571,279 B1 | 5/2003 | Herz et al. | |
| 6,574,628 B1 | 6/2003 | Kahn et al. | |
| 6,578,012 B1 | 6/2003 | Storey | |
| 6,584,471 B1 | 6/2003 | Maclin et al. | |
| 6,601,037 B1 | 7/2003 | Kolls | |
| 6,609,102 B2 | 8/2003 | Kolls | |
| 6,643,650 B1 | 11/2003 | Slaughter et al. | |
| 6,647,257 B2 | 11/2003 | Owensby | |
| 6,697,824 B1 | 2/2004 | Bowman-Amuah | |
| 6,698,020 B1 * | 2/2004 | Zigmond | H04N 5/44513 348/E5.102 |
| 6,711,551 B1 | 3/2004 | Itakura et al. | |
| 6,751,459 B1 | 6/2004 | Lee et al. | |
| 6,820,062 B1 | 11/2004 | Gupta et al. | |
| 6,826,598 B1 | 11/2004 | Titmuss et al. | |
| 6,847,822 B1 | 1/2005 | Dennison et al. | |
| 6,847,969 B1 | 1/2005 | Mathai et al. | |
| 6,915,271 B1 | 7/2005 | Meyer et al. | |
| 6,917,976 B1 | 7/2005 | Slaughter et al. | |
| 6,954,735 B1 | 10/2005 | Djupsjobacka et al. | |
| 6,965,868 B1 | 11/2005 | Bednarek | |
| 6,968,315 B1 | 11/2005 | Nakisa | |
| 6,980,962 B1 | 12/2005 | Arganbright et al. | |
| 7,062,765 B1 | 6/2006 | Pitzel et al. | |
| 7,072,840 B1 | 7/2006 | Mayaud | |
| 7,072,932 B1 | 7/2006 | Stahl | |
| 7,076,504 B1 | 7/2006 | Handel et al. | |
| 7,100,195 B1 | 8/2006 | Underwood | |
| 7,103,563 B1 | 9/2006 | Voisin et al. | |
| 7,103,313 B2 | 11/2006 | Heinonen et al. | |
| 7,136,710 B1 | 11/2006 | Hoffberg et al. | |
| 7,165,041 B1 | 1/2007 | Guheen et al. | |
| 7,171,686 B1 * | 1/2007 | Jansen | G06F 21/31 726/17 |
| 7,181,441 B2 | 2/2007 | Mandato et al. | |
| 7,181,488 B2 | 2/2007 | Martin et al. | |
| 7,206,803 B1 | 4/2007 | Bendel et al. | |
| 7,315,826 B1 | 1/2008 | Guheen et al. | |
| 7,370,004 B1 | 5/2008 | Patel et al. | |
| 8,407,285 B2 * | 3/2013 | Cheah | G06Q 10/06 709/202 |
| 2001/0020242 A1 | 9/2001 | Gupta et al. | |
| 2001/0051876 A1 | 12/2001 | Seigel et al. | |
| 2002/0035501 A1 | 3/2002 | Handel et al. | |
| 2002/0055351 A1 | 5/2002 | Elsey et al. | |
| 2003/0009392 A1 | 1/2003 | Perkowski | |

OTHER PUBLICATIONS

Des Lorimer, "Sharp Spreads its Mobile Wings," V3.UK.CO (Mar. 22, 1998), available at http://www.v3.co.uk/print_article/v3-uk/news/1973141/sharp-spreads-its-mobile-wings, 1 page.

* cited by examiner

METHOD AND SYSTEM FOR PROVIDING PERSONALIZED ONLINE SERVICES AND ADVERTISEMENT IN PUBLIC SPACES

CROSS-REFERENCE TO RELATED APPLICATIONS

The present application is a divisional of and claims priority under 35 U.S.C. § 120 to U.S. patent application Ser. No. 10/922,160, filed Aug. 20, 2004, which is a divisional of U.S. Pat. No. 6,847,969, filed May 3, 2000, and issued Jan. 25, 2005, which is a national phase entry of International Patent Application No. PCT/US00/11480, filed May 3, 2000, which claims priority under 35 U.S.C. § 119(e) to U.S. Provisional Patent Application Nos. 60/160,760, filed Oct. 21, 1999, and 60/132,168, filed May 3, 1999, the disclosures of all of which are incorporated herein by reference in their entirety.

FIELD OF THE INVENTION

The present invention relates to methods and systems for providing online services, and more particularly, to methods and systems for providing personalized and integrated online communications, information, advertising, and commercial transactions in public spaces or venues.

BACKGROUND OF THE INVENTION

The use of the Internet as a medium of both personal communication and commercial activity has increased substantially in recent years. Although the Internet has the potential to provide individual users with information content on an almost limitless number of topics, the typical manner of using the Internet suffers from a number of drawbacks. The user must specifically seek out the information he desires to obtain and may in fact be unable to do so. For this reason, many people find using the Internet to be too labor-intensive to be effectively used. This manner of accessing information from the Internet is known as "pull" technology, since the user must "pull" the information from the Internet onto his local computer. Thus it is desirable to allow users to receive desired information over the Internet without time-consuming searching.

To alleviate the burdens associated with "pull" technology, the Internet communications industry has developed "push" technology which somewhat resembles broadcasting. In the "push" model, information is delivered, or "pushed" directly to the user's computer so that the user is not required to engage in a search for the information. Borrowing from broadcasting terminology, push-based content providers "broadcast" information via "channels" of information, each channel having different content such as news, entertainment, corporate press releases, stock information, and so on. Users pick the channels they are interested in receiving, and access each channel via their browser. However, much of the information in particular channels may be of little interest to the user, who has no way of limiting the information other than selecting particular channels which might be of interest. Thus, although the "push" model does relieve the user of the burden of searching, it may provide much information that the user does not desire.

To partially alleviate the problems of "push" technology, Internet content providers have developed "push-pull" hybrid systems. In one example, news headlines are "pushed" to the user's desktop, which the user scans. To access the full story, the user must click an icon, "pulling" the story to his desktop. Such hybrid systems, however, place a high burden upon the user of sorting desired and undesired information. Accordingly, it is desirable to provide a system employing "push-pull" technology which does not overburden the user with undesired information.

Information from the Internet, as well as email communication, is typically unavailable to users in public spaces, when users are likely to engage in commercial activity and when users may need to send or receive messages from others. For purposes of the present invention, "public spaces" refers to places other than the home or personal workplace area of the user. Public spaces may include not only "common areas" within shopping areas, schools, and neighborhoods, but also areas which are privately owned such as individual stores and banks from which a user may communicate or access information via the Internet. In a preferred embodiment, each public terminal has a sponsor (such as a store, a mall, or a school or university) which provides the space for locating the terminal.

In addition to personal communications, persons in public spaces frequently have a need for general information, such as directions to a particular location or destination, which may be otherwise unavailable. Thus, it is desirable to provide a communications system using the Internet that provides users with access to a variety of useful information in public spaces. It is also desirable to provide such a system that is capable of learning the user's interests to filter unwanted information. It is further desirable to provide such a system at no cost to users.

While the Internet is commonly used as an advertising medium, Internet advertising portals do not provide businesses with a means of directly engaging Internet users because of the user-driven nature of the medium, which requires that the potential consumer initiate contact with the advertiser rather than the other way around. Thus, it is desirable to provide a communications system allowing Internet access in public places, and which allows businesses to specifically target users who desire information on particular products and services without requiring the user to search for them.

Personal communications over the Internet also suffer from a number of drawbacks. Although bulletin board or chat sites provide Internet users with the opportunity to communicate with other Internet users on particular topics, the Internet does not itself create a "virtual community" (since an individual must first find and then access the bulletin board or chat site) nor does it provide an individual with the opportunity to engage a community of users on a variety of topics. Local city or municipality based Internet sites likewise fail to provide a community of users for communication across any number of topics. Thus, it is desirable to provide a communications system using the Internet which creates a "virtual community" of users and which provides useful information to active persons in public spaces, when the user may have little other access to information.

Although existing communications systems using the Internet do not resolve the foregoing limitations, these systems do provide email or Internet kiosks or public computer networks in public spaces such as airports, hotels, and shopping malls. However, access to these networks is expensive and involves a relatively high per minute or per session charge. The high cost of such systems is exacerbated by the fact that the user must search for desired information, rather than simply receiving desired information that can be quickly reviewed. Inefficiencies inherent in Internet search engines may prevent the user from obtaining the desired information even after extensive searching, resulting not only in lost time and needless expense, but frustration to the user.

Fee-based access in public spaces is essentially the same as what the user would otherwise have at his office or home. Consequently, it suffers from all of the limitations of Internet service provider (ISP)-based Internet access. Such "pay per use" systems do nothing to alter the user-driven nature of the medium by relieving the user of the burden of seeking out desired information through search engines and other search techniques which can be both time-consuming and unsuccessful. Nor do fee-based Internet systems provide businesses with a way to engage Internet users in a dynamic, personalized way and thereby assist the user in obtaining information that the user desires.

The equipment used for existing fee-based access is bulky, has the look and feel of a traditional computer, and utilizes a standard browser or desktop interface. None of the networks offering Internet access for a per-session fee are intended to build a virtual community for which advertisers are willing to bear the cost of network construction and operation in exchange for access to these consumers. The present invention, by contrast, provides access to a network having both email and commerce oriented content at no cost to the user.

Manufacturers of small, handheld computing devices, such as the Palm Pilot™, have begun to allow their products to be used with on-board wired or wireless modems that provide access to ISPs to allow for sending and retrieving of email messages to/from the device. While such devices provide access to the Internet in public spaces, a number of drawbacks exist. The user must first purchase the hardware at prices ranging up to hundreds of dollars. Additionally, the user must have an Internet service provider account that allows for such service at an additional per-month cost. The unit itself must also be carried with the user at all times in order to access the account. Finally, the keyboard size and functionality of hand-held computing devices is limited by the size and form factor.

By contrast, with the present invention the information and communications services are provided at no cost to the user, there is no need to carry anything except a wallet keycard, and there is a full size keyboard available for sending and retrieving messages. The system also preferably includes a printer for providing the user with hard copies of desired information, and a credit card "swipe" reader for processing commercial transactions.

Cellular telephone carriers have begun to offer their customers messaging capabilities on certain cellular telephones. Additionally, there are several technology companies who are focussed on providing the cellular industry with software and servers to enhance the delivery of email and information to cellular telephones. However, while cellular telephones offer great utility for voice communications, they do not lend themselves to interacting with data communication, interactive information, and transaction processing. Given the functionality that most computer users have become familiar with on their desktop computer, the size and information display capabilities of cellular telephones limits their use as an effective means of providing consumers with access to the foregoing types of communication, and prohibits it altogether in many cases.

Accordingly, it is a purpose of the present invention to provide an integrated communication system that allows users access to email and Internet information while in public spaces. It is also a purpose of the present invention to provide a communication system that allows advertisers to directly engage potential consumers, and to specifically target system users based upon data indicating that the user is a suitable target for advertising/marketing content.

SUMMARY OF THE INVENTION

The present invention is directed to methods and systems for providing personalized and integrated online services for communications and commercial transactions both in private and public spaces. These services are provided free of charge to users. The invention also provides advertisers the opportunity to directly engage actual and potential user-consumers with selected advertising or marketing content based on each user's profile and usage history.

In a preferred embodiment, the invention provides a computer network establishing a free online community providing personalized information conveniently accessible through a network of public access stations (hereinafter referred to herein as "stations" or "terminals") and enabled by a personal system access card (e.g., smart card). The network of public access stations is sufficiently dense to provide users with a sense of ubiquity "in the streets." The system terminals are compact and easy to use, and are preferably designed with a "look and feel" unlike existing computers or kiosks.

To use the network, the user simply inserts his or her personal system access card into a slot on a terminal. First-time users may register for immediate use by providing basic personal background information to create a user profile. Users may sign up for a free email account on the network, an especially useful feature for users with no existing email service. The user profile is stored in a network database.

Whenever the user inserts the system access card into a system terminal, the system automatically updates and enriches the user profile by tracking the user's usage of the system in a usage history record. The user may send and retrieve email messages and access online services. Many online services may be included such as: a guide to the user's local area (e.g. city, neighborhood, or shopping center), with reviews of restaurants, movies, and directions to specific places; local events and happenings, with user reviews; entertainment related content such as information on music, film and style; opinion polls and surveys; phone and email directories; news and sports updates; personal schedule and address book; online shopping; immediate messaging; personalized content related to user-identified interests; and content related to local college or university.

The foregoing categories are provided by way of nonlimiting example only. Persons of skill in the art will readily appreciate that any number of online services may be included given the modular nature of the invention. However, it is preferred that the number of services be limited to a relatively small number that would be most usable to persons away from their home or business computers and "in the street."

The invention acts as a publicly accessible portal and supports a virtual community of users in public places. The invention provides internet users who already may have a "home space" and/or a "work space" on the internet with a "street space" in which personalized online services are conveniently accessible through a system network of public access stations/terminals. Users are thus able to send and receive email communications, and to access information and transact commerce via the internet.

The system also creates a highly targetable community of users to whom advertising or marketing content may be directed, and provides advertisers, marketers, and merchants with an effective one-to-one video-based, multimedia marketing tool for making their products and services known to a user population most likely to be interested in such products and services. This "street space" allows users and service providers or advertisers to interact and engage in commercial transactions.

In a preferred embodiment of the invention, a system includes a network of publicly accessible terminals located in public spaces (e.g., malls, airports, coffee shops, supermarkets, etc.) and servers. Each terminal has a unique identification code that allows the system to determine the exact physical location of the user each time he or she uses the system. Each user is provided with a system access card having a unique serial number. The card allows the user to activate any terminal in the system free of charge. At the time of first use, the user provides profile information through the terminal. In addition to basic demographic information (name, address, educational background, age, sex, etc.), the user may also indicate areas of personal interest. This information is used to create a unique user profile.

When the user has provided the information to create the user profile, he or she can then send and receive emails using the system, and access other information most desirable in public spaces. To maximize public availability of the system, each user session for public terminals is preferably limited in duration. For example, users may be limited to no more than ten minutes per session, or even five minutes per session or less in particularly high traffic areas.

The system servers include databases for storing the unique profile of each user. The user profile includes both the demographic and personal interest information provided directly by the user at the time of first use of the system as well as additional information provided through surveys and polls to which the user responds as he uses the system over time. The system also includes a usage history for each user. The usage history includes information from the offline world such as where the user received the access card for the system, where the consumer uses the service. The user's use of the system is also recorded, e.g., times and frequency of usage, responses to specific advertisements, type of content accessed by the user, etc., and included within the usage history. Information from the usage history is preferably added to the user profile.

The user profiles and histories allow advertisers to engage consumers directly and/or with specifically targeted advertisements based upon the terminal location and the user's behavioral and transactional history. Moreover, the user's physical location and the time of day are identified by the system each time the user logs on. The combined information from the user profile and user history, along with the user's physical location and time of using the system, provides pinpoint advertising capability in real time. The system provides an intelligent advertiser program to create highly targeted advertisements displayed to the user based upon the user profile and user history combined with the location and time that the user accesses the system.

The profile of the user's interests is progressively developed and personalized based upon his or her use of the system. Advertising and marketing content directed to the user can be based on user demographics, personal interests, behavior-tracking information, responses to past messages and offers, and the exact location and time of system usage. Accordingly, over time, the targeting power of the advertisements becomes progressively more efficient and effective. The user receives only advertising information tailored to his known interests and behavior.

When the user logs into a system terminal, he may use the system both to find information and conduct business transactions. In this regard, the user may quickly determine, for example, what shops, movies, or other leisure activities are available locally, and to obtain directions to the desired destination. For example, the user may use the system to summon a taxi. The system may also be able to provide the user with an estimate of the taxi fare to the location, and an indication on how long it will be before the taxi arrives. Information on public transportation will also be accessible. In short, the system will allow the user to access information that is most desirable in public spaces.

One advantage of the invention is that the user receives desired information over the internet without time-consuming searching. Another advantage of the invention is that internet access is provided in public places, and which allows businesses to specifically target users who desire information on the products offered. The invention also creates a community of users.

The foregoing, and other features and advantages of the invention, will be apparent from the following, more particular description of the preferred embodiments of the invention, the accompanying drawings, and the appended claims.

BRIEF DESCRIPTION OF THE DRAWING FIGURES

DETAILED DESCRIPTION OF THE INVENTION

Figure 1:
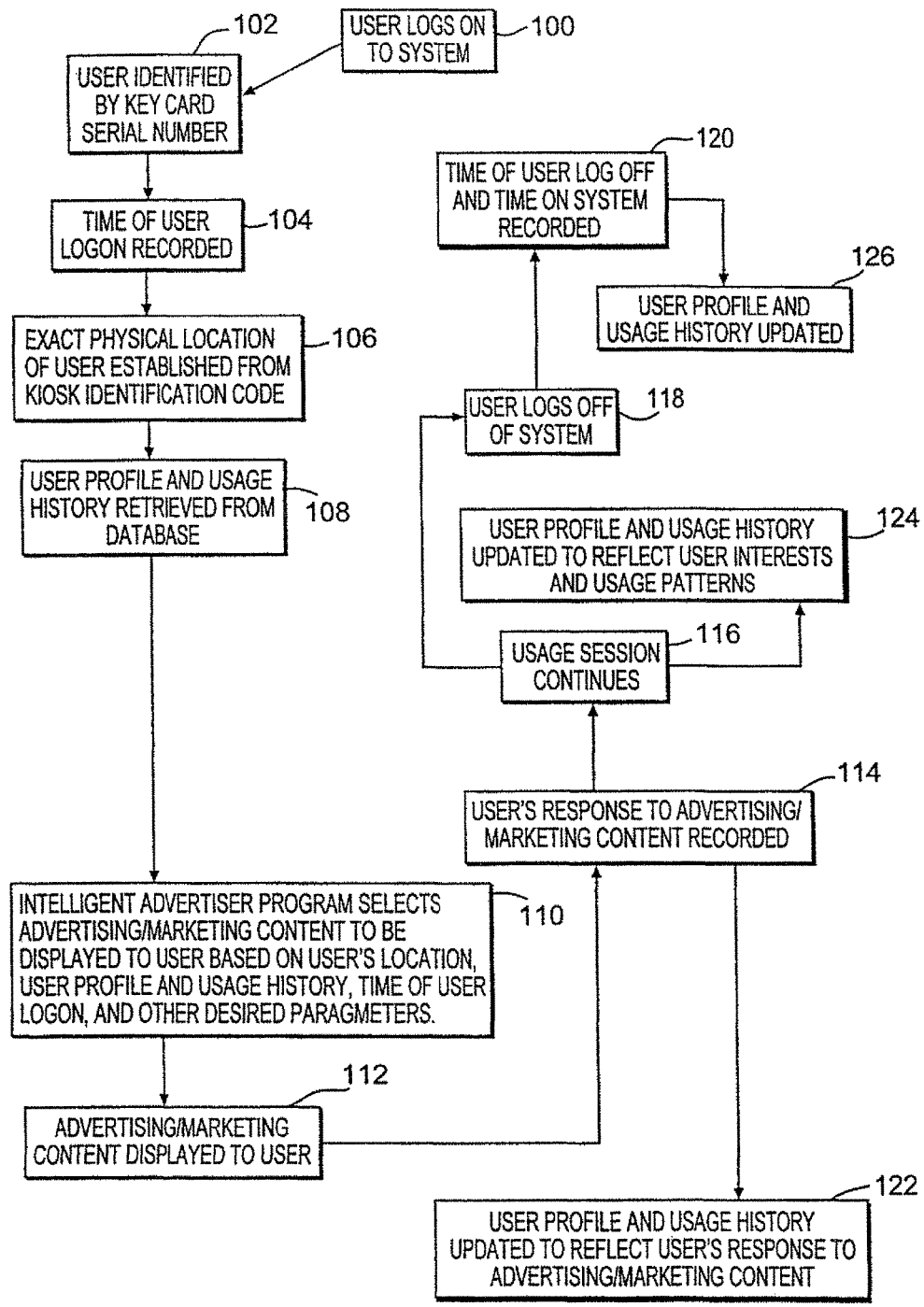
FIG. 1 is a high level flow chart of the preferred embodiment of the invention.

The preferred embodiments of the invention are now described with reference to the figures where like reference numbers indicate like elements. Also in the figures, the left most digit of each reference number corresponds to the figure in which the reference number is first used.

As shown more fully in the Figures, a system in accordance with the present invention provides a network of public access terminals ("CAT/PC") in public places to provide information services to a community of users, preferably at no cost. A unique identification code is provided for each terminal, which pinpoints the exact physical location of the user each time he or she uses the system from a public terminal. The exact location of users accessing the system from the home or office via a web site will generally not be known. However, users may provide address information allowing the system to determine the exact location. Prior art Internet-based commercial applications do not attempt to determine or utilize the exact physical location of the user. By providing this information for public terminals, the present system links offline and online commerce. A terminal in accordance with the present invention located in a suburban mall, for example, allows businesses in or near the mall to direct advertising/marketing content to potential customers in real time when there are nearby, actively shopping, and thus more likely to act favorably on advertising messages. Using the system of the present invention, a sporting goods store located in the mall may direct advertising messages to system users accessing the mall terminal. The advertisement may for example include a coupon redeemable on certain merchandise by the user at the sporting goods store, and may provide precise directions from the user's exact location to the store.

In the preferred embodiment, a user is provided with an access card (e.g., (smartcard), which may be obtained from an advertising sponsor of the system or from the system operator. Each access card used in the system has a unique serial number to identify the system user. The access card may also be provided with credit and/or debit card functionality to allow users to make purchases directly from a terminal.

Preferably, the public access terminals include a touch sensitive screen that allows the user to use the system quickly. However, a mouse or other type of interface may be used instead of touchscreen buttons. A keyboard is also preferably provided to enable the user to enter information. When a user inserts the access card into the system, the terminal displays a main menu from which the system services may be accessed. Services and information content may be provided either directly by the system operator or by third party advertisers and content providers. It is also desirable to provide opportunities for system users to generate content for the system to enhance the user's sense of participation in a "virtual community" of system users. In particular, users may be allowed to provide critical reviews of movies, concerts, restaurants, coffee shops, and similar places or events.

While any number of services may be provided to the user, it is desirable to limit the number of services to those most useful in public spaces. Accordingly, the system preferably provides users with features that are very compelling, easy to understand, and geared toward active users who are "on the street." The following description of a preferred embodiment is provided by way of nonlimiting example only. It may readily be apparent to those of ordinary skill in the art that different or additional user services may be provided.

In addition to user services, the system provides a method of generating and delivering pinpoint advertising/marketing content based upon (1) the user profile, (2) user history, (3) the physical location of the user, (4) the time of day the user accesses the system. The combined personal information from the user profile and user history, along with the user's physical location and time of using the system provides pinpoint advertising capability in real time.

More particularly, the method of the present invention allows businesses to engage consumers directly and/or with specifically targeted advertisements, as shown in FIG. 1. As shown therein, when a user inserts an access card into a system terminal at step 100, a unique identifier code on the user's access card identifies the user at step 102. The exact time at which the user logs on and off of the system is also recorded at steps 104 and 110, respectively. In addition, at step 106 the identification code of the terminal is used to identify the precise location of the user. It will readily be appreciated that combinations of less than all of the foregoing data may also be used to advantage. For example, even if the physical location of the user is unknown (as in the case of users accessing the system from home or work), targeted advertising may still be directed to the user based upon the user profile, user history and time of day.

As further illustrated in FIG. 1, once the user has been identified, the user's logon time has been recorded, and the user's exact physical location established, system databases access the user profile and usage history at step 108. The user profile is a compilation of data concerning the user that includes demographic and personal interest information provided directly by the user, preferably at the time of first use of the system, and information generated as the user responds to surveys and polls as he or she uses the system over time. It is preferred to make the user's initial registration to use the system as fast and easy as possible. Accordingly, in a preferred embodiment, the user provides only his or her name, sex, year of birth, and postal code, although additional information may also be required. When the user has logged onto the system a number of times, preferably on the third user login to the system, the user is provided with a menu to select from among a number of special interests. The user can select up to a preset number of interest categories. The user's interests are then preferably added to the user profile. Although any number of selectable categories may be used, the following are provided as nonlimiting examples: sports; alternative sports; arts and literature; intellectual challenges; business; environment; film history and trivia; fitness; games; men's issues; women's issues; music; outdoors; politics; psychology; technology; travel; and cooking.

The usage history records the user's use of the system, and includes information from the offline world such as where the user received the access card for the system, and where the consumer uses the service most frequently. In a preferred embodiment, the system also records and adds to the usage history the number of times logged onto the system by the user, the total time of each usage session, each system page accessed by the user and the length of time that page is viewed by the user. However, additional aspects of the user's use of the system may also be recorded and used to more effectively enhance the user's experience with the system and increase the effectiveness of advertisements directed to the user. Further, although usage history is treated herein as a separate data set from the user profile, persons of ordinary skill in the art will appreciate that the usage history may be combined as part of the user profile.

The system provides an intelligent advertiser program to create highly targeted advertisements to the user based upon the user profile and user history combined with the location and time that the user accesses the system. Referring again to FIG. 1, when the user profile, user history, physical location, and time of day are provided to the system, the intelligent advertiser program selects advertising/marketing content for display to the user on a rolling basis, as illustrated by steps 110 and 112 of FIG. 1. The intelligent advertiser program may use any or all of the foregoing information to select advertising/marketing information that is most likely of interest to the user. In addition, the intelligent advertiser can use the information to actively eliminate certain advertising content that is unlikely to be of interest to the user. The system also "learns" the user's preferences by monitoring his or her responses to the advertising content that is provided. Content to which the user fails to respond or indicates that he does not wish to receive in the fixture can be eliminated, curtailed, or altered in future usage sessions.

Figure 2:
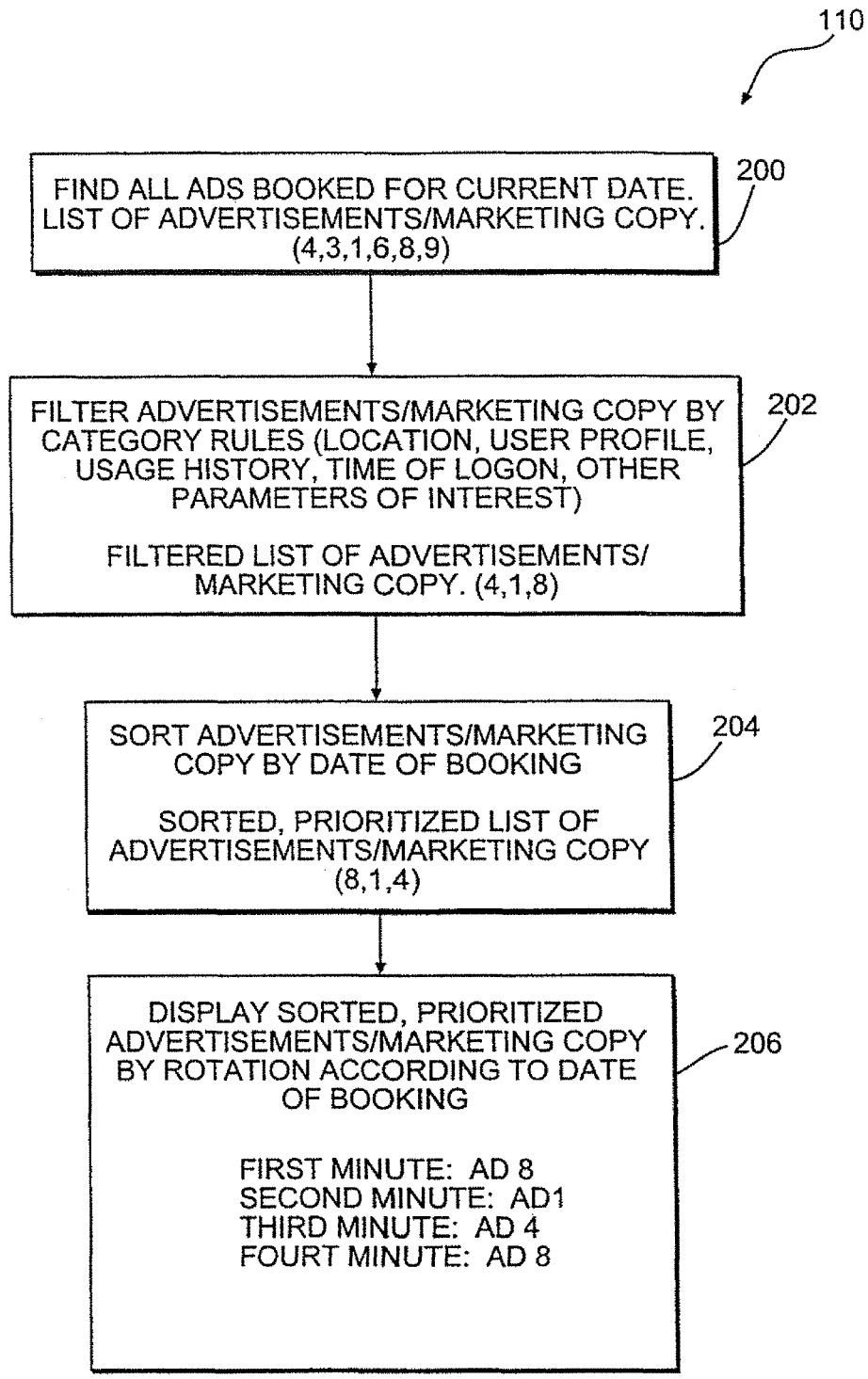
FIG. 2 is a high level flow chart of an exemplary intelligent advertising program.

FIG. 2 provides a block diagram depicting an intelligent advertiser program according to step 110 of FIG. 1. As indicated by step 200 of FIG. 2, the program locates and identifies all advertisement files for display in a system according to the present invention, resulting in a list of advertisement files. The files are then sorted, as depicted in step 202, according to category rules, which may be based upon variables of interest such as the user's location, user profile, usage history, time of day, or name of the user. The filtered advertisement list is then sorted by date of booking, as indicated in step 204. Accordingly, advertisers who booked their advertisements earlier will have display priority over later booked advertisements for display on the same date and/or at the same location. The advertisements are displayed to the user on a rotating basis according to booking date. The user's responses to the advertisements are recorded and added to the user profile and/or usage history, along with other aspects of the user's usage session, as shown in steps 114-126 of FIG. 1.

Figure 3:
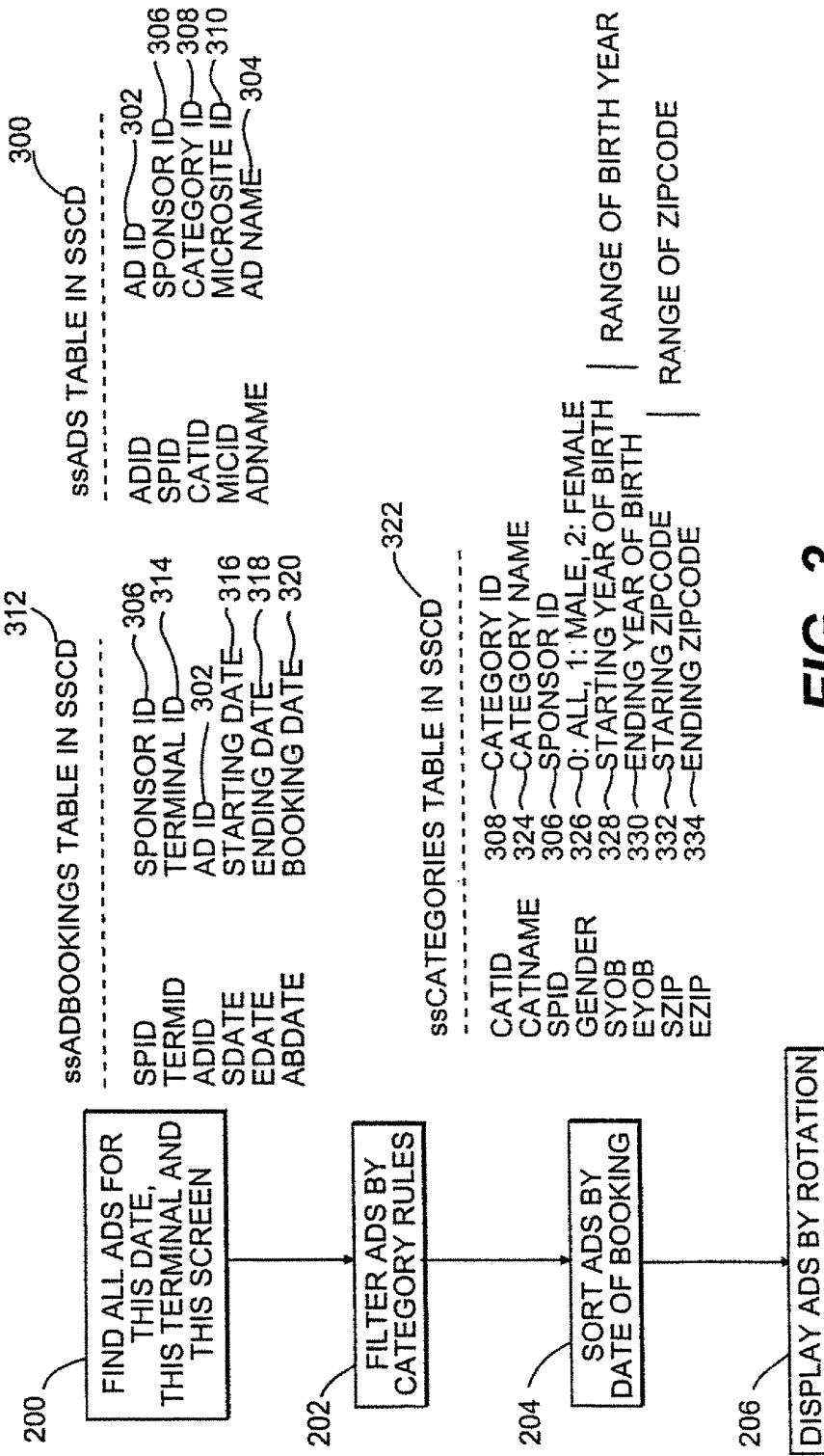
FIG. 3 is a block diagram illustrating a database and data flow for an exemplary advertising model.

FIG. 3 provides additional detail on an embodiment of an intelligent advertising program according to the present invention. As indicated, the program includes a number of tables stored in databases of the present system. In a preferred embodiment, the tables are stored in a central database of the system. An "ADS" table 300 provides information on the advertisements for display in the system. Table 300 stores values identifying the advertisements by advertisement number ("ADID") 302, name of the advertisement ("ADNAME") 304, sponsor of the advertisement ("SPID") 306, category of the advertisement ("CATID") 308, and by a microsite identity ("MICID") 310 associated with the sponsor.

The intelligent advertising program also preferably includes an "ADBOOKINGS" table 312 that provides information on when and where the advertisements are to be displayed. More particularly, along with the advertisement number ("ADID") 302 and sponsor identification ("SPID") 306 information from the "ADS" table 300, the "ADBOOKINGS" table 312 also includes fields to identify the specific geographical locations (i.e., terminals) at which the advertisement is to be displayed ("TERMID") 314, the start ("SDATE") 316 and end ("EDATE") 318 dates for the advertisement, and the date upon which the advertiser booked the advertisement for display in the system ("ABDATE") 320.

Finally, the intelligent advertiser program includes a "CATEGORIES" table 322 to enable advertisements to be sorted by specific category rules. Exemplary fields that could be used in an embodiment of the invention for such filter rules are provided in FIG. 3 by way of nonlimiting example only. These include fields to identify particular filtering categories by name ("CATNAME") 324 and identification number ("CATID") 308. In addition to identifying the sponsor ("SPID") 306, the "CATEGORIES" table 322 also includes a "GENDER" field 326 to allow advertisements to be displayed on a single-sex basis if desired. The system also preferably allows sorting by age ranges using fields for starting year of birth ("SYOB") 328 and ending year of birth ("EYOB") 330. Similarly, advertisements to run in particular postal code areas can be identified by a zip code range using the starting zip code ("SZIP") 332 and ending zip code ("EZIP") 334 fields. Additional category fields, such as particular areas of interest, can be created as desired by persons of ordinary skill in the art. For example, particular areas of interest such as traveling, sports, or music could be used to sort advertisements if desired. Moreover, the categories can be made as narrow or as broad as desired by the sponsor to reach a desired target user population.

Figure 4:
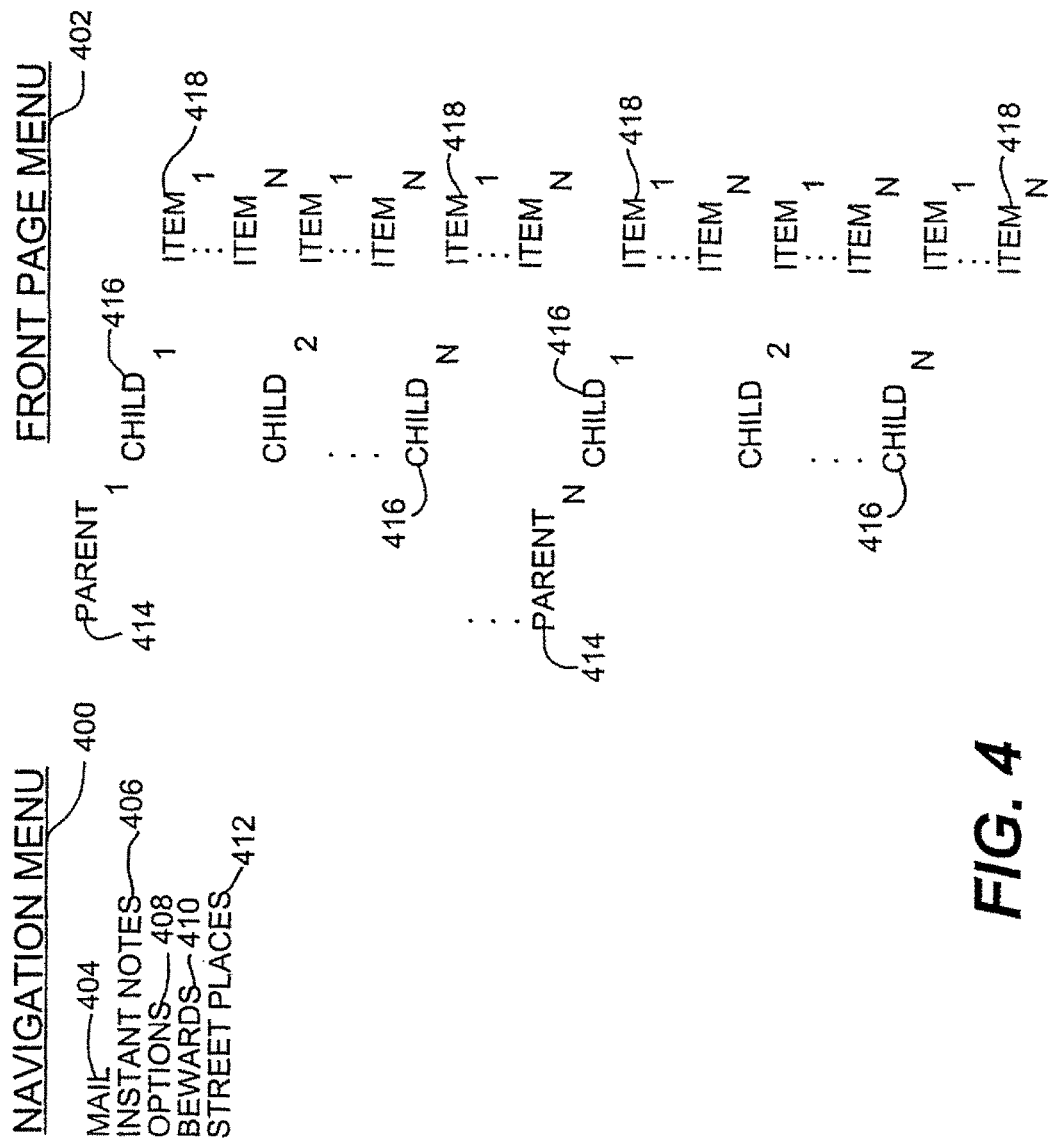
FIG. 4 is an illustration of a preferred embodiment of the invention in which features are provided grouped into a navigational menu and a front page menu.

The system employs a multimedia user interface that is preferably not web-based, although some pages in the user interface may allow the user to "direct click" to other pages accessible via the Internet, for example an advertising sponsor's web page. As shown in FIG. 4, system features of a preferred embodiment are provided either as part of a "navigation menu" 400 or a "front page menu" 402. The navigation menu 400 preferably includes an email ("mail") 404 feature, an instant messaging ("instant notes") 406 feature, an "options" 408 feature which allows users to change passwords and similar basic information, a "rewards" 410 feature which allows users to participate in programs based upon system usage, and a "street places" 412 feature which provides a listing of all system terminal locations within a desired geographical area, which may be a city, metropolitan area, state or other basis. The navigation menu 400 also preferably includes a "about streetspace" 508 touchscreen button to provide helpful information about the system, and an "exit" 510 touchscreen button to terminate a user session and exit the system, as shown more clearly in FIGS. 5-7.

As further shown in FIG. 4, the front page menu 402 features are provided as a series of features and subfeatures designated as "parent" (i.e. first level) 414 features, "child" (i.e., second level) 416 subfeatures, and "item" (i.e. third level) 418 subfeatures. As shown in FIG. 4, any number of parent 414, child 416 and item 418 features can be provided. However, the number of such features is preferably limited to those most useful to active users in public spaces. Further, persons of ordinary skill in the art will appreciate that additional levels of features may be provided (i.e., fourth, fifth or lower levels) without departing from the scope of the invention.

Figure 5:
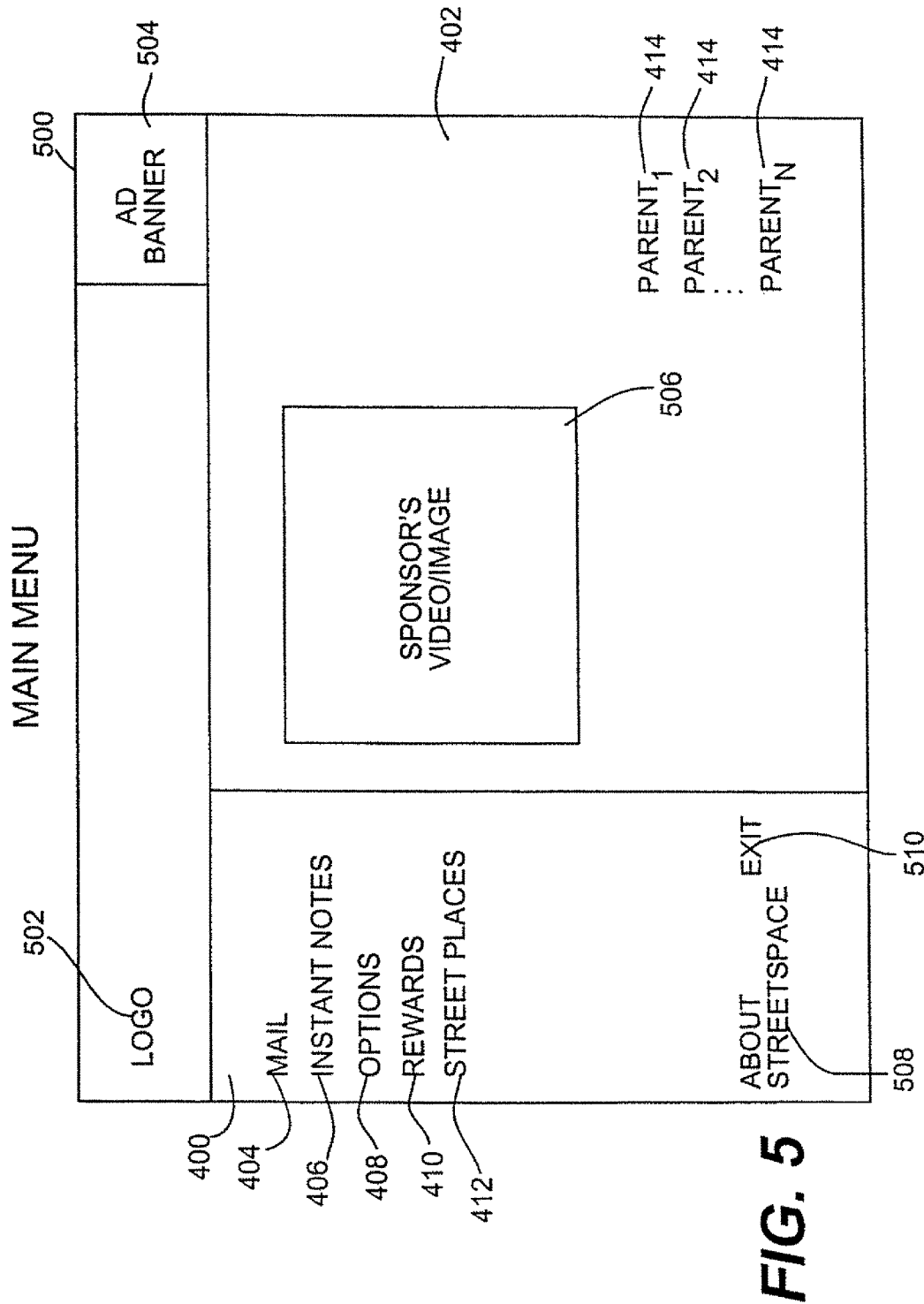
FIG. 5 is a high level block diagram illustrating a main menu of a preferred embodiment of the invention.

A high level block diagram of the main menu page 500 of a preferred embodiment of the invention is provided at FIG. 5. As shown therein, the main menu page 500 includes a system logo 502 at the top left of the main menu page 500 and an advertising banner of an advertising sponsor 504 of the system at the upper right hand portion of the menu 500. Advertising banners 504 are selected for display on a rolling basis to users based upon the user profile, user history, physical location of the user, and time of day, as previously discussed. Each advertising banner 504 is provided with a touchscreen, which takes the user to an advertising page for that advertising sponsor, which may provide specific offers to the user. The main menu page 500 provides a navigation menu 400, illustrated on the left hand side of FIG. 5, which preferably comprises a number of touchscreen buttons corresponding to the navigation feature discussed previously regarding FIG. 4.

As further shown on the right hand side of FIG. 5, the main menu a 500 also preferably provides a front page menu 412 that includes a touchscreen button listing of the "parent"

414 features of the front page menu 402 as already noted in FIG. 4. Touching any parent 414 features calls up a menu listing the "children" 416 of the particular parent 414 feature. Finally, the main menu also preferably includes a video or image which may, for example, be provided by a system sponsor, or which may relate to an area of interest to the user.

Figure 6:
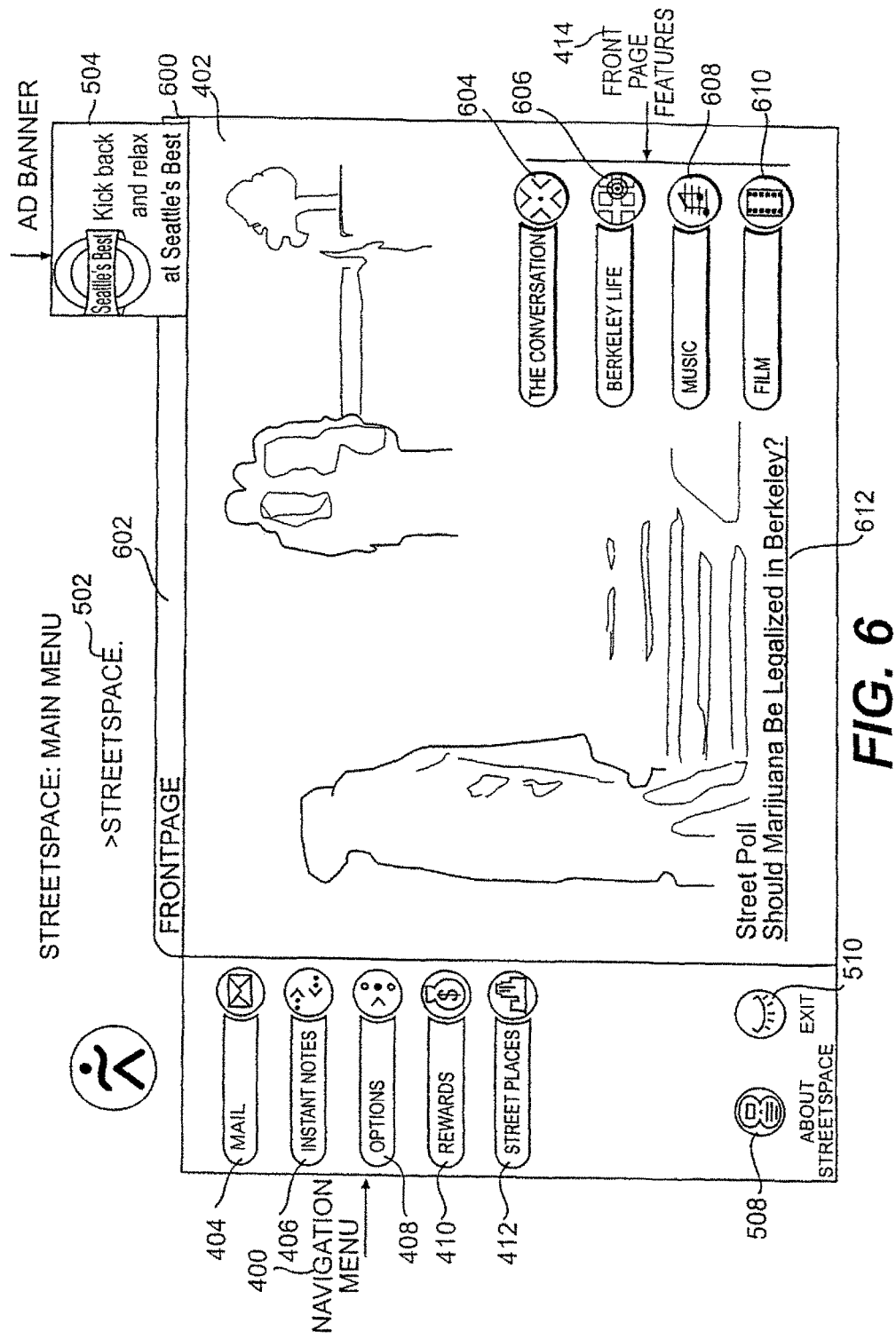
FIG. 6 is a sample main menu.

A sample main menu page 600 according to the block diagram of FIG. 5 is provided in FIG. 6. Included is a system logo 502 provided at the top of the main menu page ("streetspace" and logo), a sponsor advertising banner 504 in the upper right hand corner, and a "front page" bar 602 immediately below the system logo indicating that the user is at the main menu of the system. As already noted, advertising banners 504 are selected for display on an individual basis, depending upon the user profile, usage history, geographical location, and time of day. By touching a designated area of the advertising banner 504, the user can access an advertising page from the sponsor of the advertisement. The advertisements may include coupons, which can be printed out on an attached printer in the system, or downloaded onto a system card.

The sample navigation menu 400, provided at the left side of FIG. 6, includes touchscreen buttons designated as "mail" 404, "instant notes" 406, "options" 408, "rewards" 410, and "streetplaces" 412.

The "mail" 404 feature, shown as one of the navigation touchscreen buttons in FIG. 6, takes the user to an email page that allows the user to send and receive emails. Users are able to read mail, write/send mail, and include file attachments, store names and addresses in an address book, and retrieve mail from another email account (i.e., an email account not on the system) using a feature referred to as "other mail." The user's mailbox can preferably store up to 3 MB of messages and also features the current mail storage total for easy reference. When a user receives an email, the system preferably recognizes whether or not the sender's address has already been entered in the user's address book and, if not, allows the user to enter the address into his or her address book by clicking "yes" when prompted. In one embodiment of the invention, a banner is provided at the bottom of every message that is sent by a system user. The banner allows the recipient of the email from the system user to open an account in the system by merely clicking on a particular part of the message. This serves to rapidly increase the number of system users. The mail room menu may optionally include an email directory which provides users a way to find any published email address for people or businesses. The user will type in the name of the person or business, touch the search button, and receive the email address. By then clicking on the email address, a new email message will open, with the new address already inserted, ready for the user to begin writing.

It will be readily apparent by those of ordinary skill in the art, however, that a number of additional or different email functions may be included from those discussed above. A wide array of email systems and features known in the art can be incorporated into the present system.

The "instant notes" 406 feature on the navigation menu 410 allows users to send email notes to other system users in a faster and more direct form than regular email. The instant notes feature is suited for sending short messages and works faster than regular email. In a preferred embodiment, the text body allows up to 255 characters, although this amount can be changed as desired by a system administrator. Before a user is able to send instant notes, the user may search for friends on the system via a search engine provided in the feature and preferably must await authorization from the other person before the user may send instant notes to the other party. The instant notes page preferably displays whether an intended recipient of an instant note is online or offline, and whether the recipient has authorized the user to send instant notes to him or her. As the foregoing indicates, a user may block other users from sending instant notes to him or her. Once instant notes are authorized between two users, they may be sent whether or not the recipient is online when the message is sent. If the recipient is online, the message will immediately appear, on whatever screen the recipient is viewing, as an adhesive note symbol in the upper corner of the recipient's screen, with text in a "handwritten" font. If the recipient is not online when the instant note is sent, the system is preferably stored by the system and displayed as an instant note immediately upon the next system use. Alternatively, however, the note may be processed as a regular email to the user.

The "options" 404 feature, shown on the navigation menu 400 in FIG. 6, allows the user to change a password to ensure privacy and security, change a backup password question and answer, change the user's postal code in the user profile, and create a signature. In a preferred embodiment, the user may enter as a backup password a question and answer only known to the user. Both the user's regular password and the backup password may be easily changed using the options feature. In addition, the options feature allows the user to customize a message to appear at the end of every email the user sends. The user types the message to create the signature and submits it. The signature then appears at the end of each email message the user sends.

The "rewards" 410 feature on the navigation menu 400, allows users to participate in a "frequent users" program. Points are accumulated based upon system usage, with more frequent usage generating more reward points. Points may be accumulated, for example, by sending emails on the system, posting instant notes, accessing sponsor advertisements, etc. Reward points may be redeemable for rewards such as clothing and merchandise displaying the system logo, by way of nonlimiting example. In a preferred embodiment, touching the "rewards" 400 touchscreen button may access a rewards page. The rewards page may display a "reward of the month" which users may redeem based upon their accumulated rewards points. The rewards page includes two submenus. The first submenu displays the various actions by which users may accumulate reward points. For example, users may accumulate five reward points for logging onto the system from a public terminal, four points for logging onto the system from their home or work computer, three points for posting an instant note, and two points for sending an email via the system. However, it will readily be appreciated that different or additional reward points or systems may be included.

The "street places" 412 feature takes the user to a listing of all available pubic terminals within a desired geographical area. Alternatively, there may be a parent menu displaying the entire country of the entire world which the user may narrow by sequentially accessing touchscreens to find all available public terminals anywhere. Fore example, a may of the entire world may contain a touchscreen for North America, which may then be narrowed down to a nation such as the United States, then a state, such as California, and tally a county, city or metropolitan area, for which all terminals in the area may be listed. The list of local terminals also preferably indicates the sponsor for the terminal, and includes a touchscreen providing background information on the sponsor, such as a bookstore, a bank, a shopping mall, or a university. The background information page may be different from a sponsor's page from a banner advertisement, previously described, which are displayed based upon the user's physical location (terminal), user profile, usage history, and the time of day in accordance with the advertising model previously discussed. The street places 412 feature allows the user to understand where the system can be accessed publicly, and also provides an indication of how the system is growing as new terminals are added to the system.

The navigation menu 400 also includes a feature describing the system, designated as "ABOUT STREETSPACE" 508 in FIG. 6. This feature preferably includes four submenus, including a demon providing instruction on using the features of the system, a privacy statement indicating the system owner/administrator's policy on protecting user privacy, a mission statement of the aims and goals of the system, and a "terms of use" statement to which users must agree when signing up to use the service.

Finally, the navigation menu 400 also includes the exit 510 feature, also provided with a touchscreen button as indicated in FIG. 6, which terminates a usage session. The exit 510 feature also preferably displays an indication to the user that he or she has been logged off and the usage session concluded.

The sample front page main menu 600, provided at the right side of FIG. 6, includes four touchscreen buttons for the "parent level" 414 features. In a preferred embodiment, three parent 414 features, accessible by touchscreen buttons, are designated as "the conversation" 604, "music" 608, and "film" 610. In addition, a fourth feature, local life (shown as "Berkeley Life") 606 is provided for local issues and content. This local life 606 button will be specifically designated according to the location of the terminal, and the content accessible by this button will be unique to the local metropolitan area, city, town, or even neighborhood. In the embodiment of FIG. 6, which corresponds to a system that might be used in Berkeley, Calif. The main menu 600 of the system preferably also includes a poll question 612 as part of the front page menu 600. The poll question 612, which may be changed daily or even more frequently, allows users to participate in a "virtual community" providing content to the system. Poll questions 612 may also be provided in any or all of the submenus or pages of the system. Poll questions 612 in the submenus are preferably different from those in the main menu.

Figure 7:
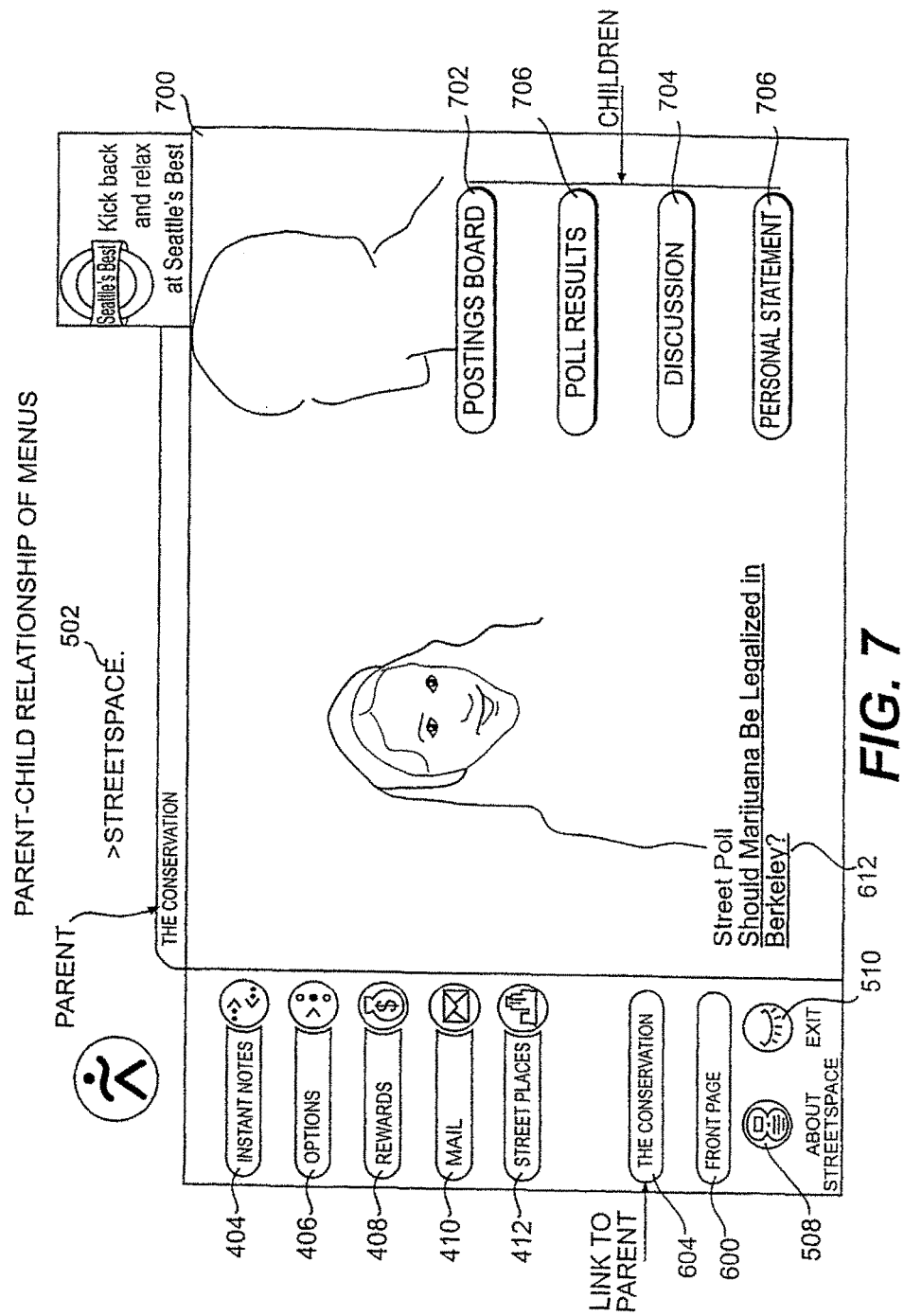
FIG. 7 is a diagram illustrating a sample of the parent-child relationships among menus.

The conversation 604 feature from the front page menu 600 is a user driven area allowing discussion and debate on various topics as shown in FIG. 7. Four submenus are preferably provided, including a "postings board" 702, a "discussion" 704 section, a "poll results" 706 page, and a "personal statements" 708 section. All discussions are threaded to allow users to easily pick up on a discussion topic. The "postings board" 702 provides a classified advertisements section where users can advertise products and services or browse through advertisements and make purchases. The "discussion" 704 section includes a listing of all poll questions from the different menu pages, and further allows users to post opinions on a series of discussions in the form of a threaded discussion list. Users may post new topics for discussion or respond/join an existing discussion. The "poll results" 706 page provides tabulated results for all poll questions in the system. The "personal statements" 708 section allows users to post longer personal statements or essays on a variety of topics. Users are preferably required to subscribe to the "personal statements" 708 section to receive weekly updates to this section. Users may unsubscribe at any time by clicking on an unsubscribe button (not shown).

With reference to FIG. 6, the music 606 feature from the front page menu 600 preferably comprises a music review section. This section preferably features a weekly music trailer sponsored by an advertising sponsor, or a music video. Users are able to read and post reviews of the featured music. In addition, the music feature may include a listing of local concerts and other music-related events, and allow users to post reviews of recent such events.

The film feature 610 from the front page menu 600 preferably comprises a movie review section. Each week the feature includes a trailer sponsored by an advertising sponsor. Users may read and post reviews of the featured film. In addition, the music feature preferably includes a listing of local theatres, the movies playing in them, and the show times for each film, along with short descriptions of each move, the actors/actresses featured, the director, release date, and similar background information. The movie guide also allows preferably allows searching by the foregoing categories, e.g., cinemas, show times, actors. In addition, the section may also provide additional information on separately accessible, miniature web sites for particular cinemas and films. The user may also obtain directions to each cinema from the users terminal, and may purchase tickets directly from the terminal through a "buy now" button by a credit or debit card reader that is preferably a convenient "swipe" terminal. The system preferably includes a connection to local taxi services, and allows the user to summon a taxi to the terminal location to take the user to the desired location. Information on public transportation is also preferably provided.

The local issues and content feature of the front page menu, designated in the exemplary embodiment of FIG. 6 as "Berkeley life" 606, includes subsections having content directed to the local area in which the terminal is located. The local life menu preferably allows the user to obtain information on items of interest in the city or town in which the terminal is located. Subsections within the local scene portion of the menu may include a video guide to the city, metropolitan area, or neighborhood, a nightlife guide, restaurant and coffee house guides, and online ticket sales for local events. Each of these subsections may contain a variety of additional information readily accessible by the user. Additional subsections within the local life feature may provide opportunities for both online and "brick and mortar" shopping, cultural events and activities, and local news and gossip.

The nightlife guide subsection of the local life feature preferably includes complete local listings of bars, lounges, pubs, and dance clubs, allows the user to search by categories such as type and location, and provides complete directions to each listed establishment. In addition, the section preferably allows users to submit reviews, comments, and recommendations for access by other system users, and may also provide separately accessible, miniature web sites for different establishments.

The restaurant and coffee house guide subsection of the local life feature preferably includes complete local listings of restaurants and coffee houses, allows the user to search by categories such as cuisine, hours of operation, prices, and location, and provides complete directions to each listed establishment. The section also preferably includes menus for each restaurant, and allows users to submit reviews, comments, and recommendations for access by other system users. Separately accessible, miniature web sites may also be provided for different establishments.

A sports events subsection of the local life feature may also be provided. This subsection preferably allows event searching by category and date, and allows users to buy tickets and submit comments and opinions. A complete listing of local festivals, which may be searchable by theme and dates, is provided in a festival subsection, which also preferably allows users to purchase tickets.

The music, film and local life features preferably include online ticket sales subsections to allow users to purchase tickets for live music, theatre and sports events, as well as local festivals. Tickets are preferably purchased using a "buy now" touchscreen button and the credit or debit card "swipe" reader attached to the terminal. The local scene menu also includes a shopping center section which provides opportunities for shopping in both online and "brick and mortar" stores. The shopping center section preferably includes miniature web sites for both types of stores, including for example supermarkets, clothing, music, book, furniture, and luggage. Users preferably are also provided with access to numerous personal services including health clubs, video stores, hair stylists, auto repair, banks, hotels. These services may be purchased on the system through miniature web sites for different establishments. Professional services, such as medical, legal, and travel agent services, may also be obtained in a similar manner. The system allows electronic commerce merchants to make sales in related retailer space. For example, the system could allow a shoe company to sell athletic shoes at a fitness center. A bookstore could sell books at a coffee house, and a sports team could sell tickets at a sports bar. Additionally, the system allows advertisers to introduce consumers to online versions of retail brands.

Figure 8:
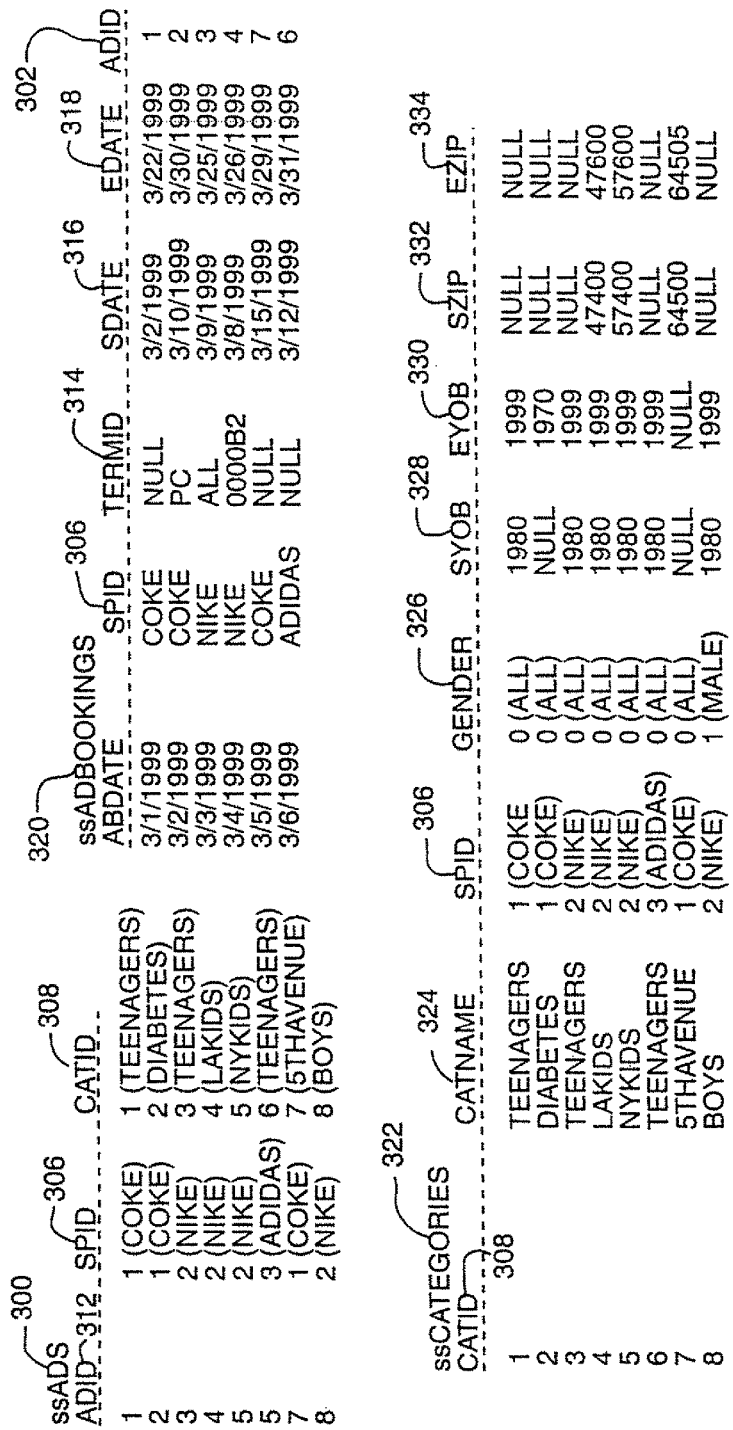
FIG. 8 is a high level chart illustrating ad booking and ad categories used in an exemplary advertising model.
Figure 9:
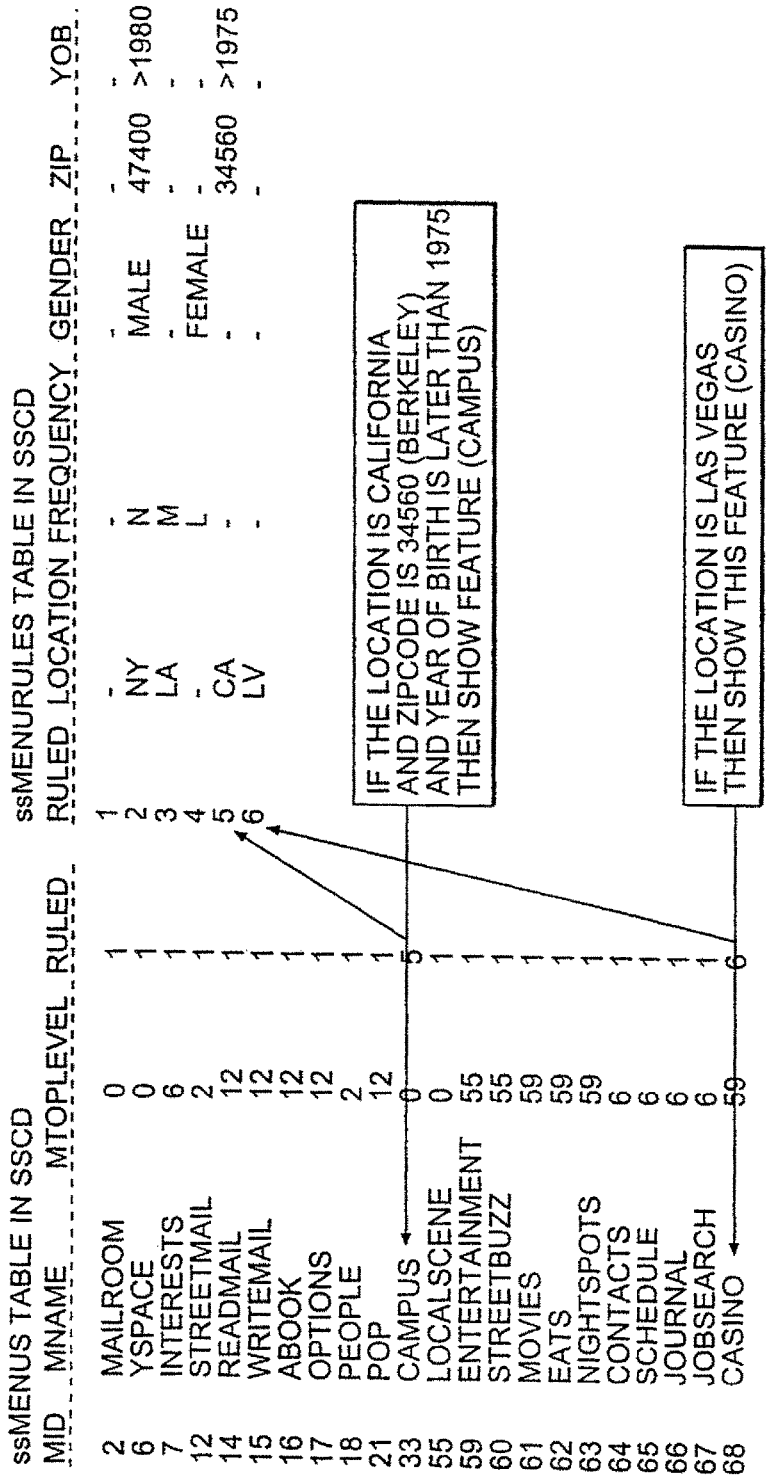
FIG. 9 is a diagram illustrating exemplary user profile-based features.

Sponsors of miniature web sites preferably pay a nominal fee for being included within the system, and additional fees may also be paid each time a user accesses the miniature web site. Such a performance based advertising model differs substantially from the flat fees typically paid for "banner-type" online advertisements, and are more cost-effective because the fees paid by the advertiser are directly tied to the amount of commerce "traffic" generated through the system. FIGS. 8-9 provides further details on an exemplary advertising model and user tracking features of a system in accordance with the present invention. The system records each transaction not only to determine the sponsor's fees, but also to update the user's personal profile to increase the effectiveness of future advertisements targeted to the user. The miniature web pages preferably follow a standardized format, but may be customized to convey the brand identity of the sponsor. By providing a portal to young, active consumers and closely tracking their interests on an individual basis, the system allows marketers to create their own sub-categories of targeted consumers.

To facilitate commercial transactions, the credit card reader preferably is capable of reading and accepting credit cards, debit cards, and ATM cards as well as the user's personal keycard. The user will be required to enter a name, address and card number only on the first online purchase, after which transactions will be automatically handled whenever the user clicks the "buy now" button on the touchscreen. To alleviate user concerns about credit card or ATM card theft, the system preferably provides a privacy protection package that includes a strong security message on both the main menu and in the shopping center section. A familiar symbol such as a bank vault may be provided to reinforce the security message.

Each of the touchscreen buttons on the navigation menu 400 and the "parent" 414 buttons on the features menu take the user to a secondary menu displaying the particular services associated with the main menu button. The relationship between the "parent" 414 and "child" 416 menus (i.e., primary and secondary features) is indicated more clearly in FIG. 7. The system also allows broadband advertising in the user interface. Additional system features can be added easily, as would be apparent to one skilled in the art.

The front page menu 600 may optionally include a "your space" feature (not shown) to provide a place where users can find special content and offers related to specific subject matter of interest to the user. The "your space" section may provide the user with an inbox for receiving special offers from sponsors. This in-box is similar to but different from the email in-box. By clicking on the "your space" in-box, the user will then be able to view the number of offers received and their respective headers. For example, if a user is interested in travel, the in-box may indicate that there are five offers waiting. The header of one such offer may indicate that an airline sponsor is offering a 20% discount on all flights booked that day. The user will then be able to choose whether or not to click on the header to read the details of the offer, after which the user will be able to choose whether or not to make a purchase.

In addition to offers received in the in-box, the "your interests" feature may include content directed to the interests selected by the user. The content would preferably include localized video content that is updated regularly as an incentive to the user to access the "your space" section. The your interests feature may also provide a "discussion" subsection that allows users having common interests to communicate with one another. A user will be able to enter a discussion by clicking on the user ID of another user taking part in the discussion and sending an instant note directly to the person.

Because the system tracks all aspects of the user's use of the system, including which interest categories the user clicks on, how often, and what the user does afterward, the system provides numerous opportunities for one-on-one marketing. Over time, the user may be asked additional questions to further define the user's interests within particular categories to update the user profile. Such information allows sponsors to better pinpoint particular offers to the user. By optionally providing a separate in-box to receive offers, the "your interests feature" may help to avoid cluttering the user's mailbox.

The front page menu 600 may further optionally provide an "on-campus" (not shown) button for terminals located in college and university settings. This feature helps attract college-age users by providing features related to the local university, including providing touchscreen access to the university's web site and a way to purchase textbooks online. Information typically available on the college or university web page includes campus news and events, curricula, academic calendar, financial aid information, phone and email directories, clubs, athletics, maps, health services, parking, transportation, live campus views, and other information. The on campus feature may provide a subsection allowing students the ability to purchase textbooks online. This would allow the student to place an order for books and either pick up the books at the bookstore counter or have them delivered directly to the student's dormitory or apartment. The "on campus" feature may further include a feature known as "dorm space." Volunteer students have cameras installed in their rooms to make portions of the volunteer students' daily lives available to system users. Volunteers preferably would agree to keep the camera on for a minimum of ten hours per day, and the hours they choose would be published. Users would be able to click on a particular student's room and see what the student is doing in real time. During certain hours, users would also be able to engage in real-time communications with the dorm space volunteers. The "on campus" menu also preferably includes a "favorite study spots" section that allows users to contribute content by listing favorable locations for studying.

Since users are limited in their maximum time on public terminals, the system may optionally include a "duffel bag" (not shown) feature allows users to put pages of interest into a separate memory "duffel bag" of information. The user can access the information later from the home or office through the system web site. Each system page may include a duffel bag icon in the right hand corner. By simply clicking on the icon, the user may place the information on the page in memory space for later access. This feature would allow the user to place everything that he or she finds interesting in a single place, minimizes the time required for an online session, and enable the user to easily access the information from home, office or school, where more time is available to review it.

The system may further optionally include a "thumbs up/thumbs down" feature to remove information that is of no interest to users. The feature provides a "thumbs up/thumbs down" icon on certain pages of the system. Items receiving a "thumbs down" from a majority of users may be deleted from the system. This feature allows user to shape the content of the system, and increases user satisfaction by removing irrelevant or useless information.

To encourage use of the system from home and office as well as from public terminals, users may optionally be provided with an incentive message on exiting the system, such as a notification of a contest or other compelling information that is only accessible via web site from the home or office. It may also be required that the user access the contest or other information the same day as the message is provided, or within some other short period of time. Messages may be changed on a daily or other regular basis to continually encourage use of the system from home and office as well as through the public kiosks.

In another preferred embodiment of the invention, a collaborative works (not shown) feature is added. This feature allows users to work collectively on a project from the public terminals, or at home and work. For example, one project can be the making of a movie. With such a feature, users contribute video and audio, while others provide editing and directing functions to formulate the final product.

Figure 10:
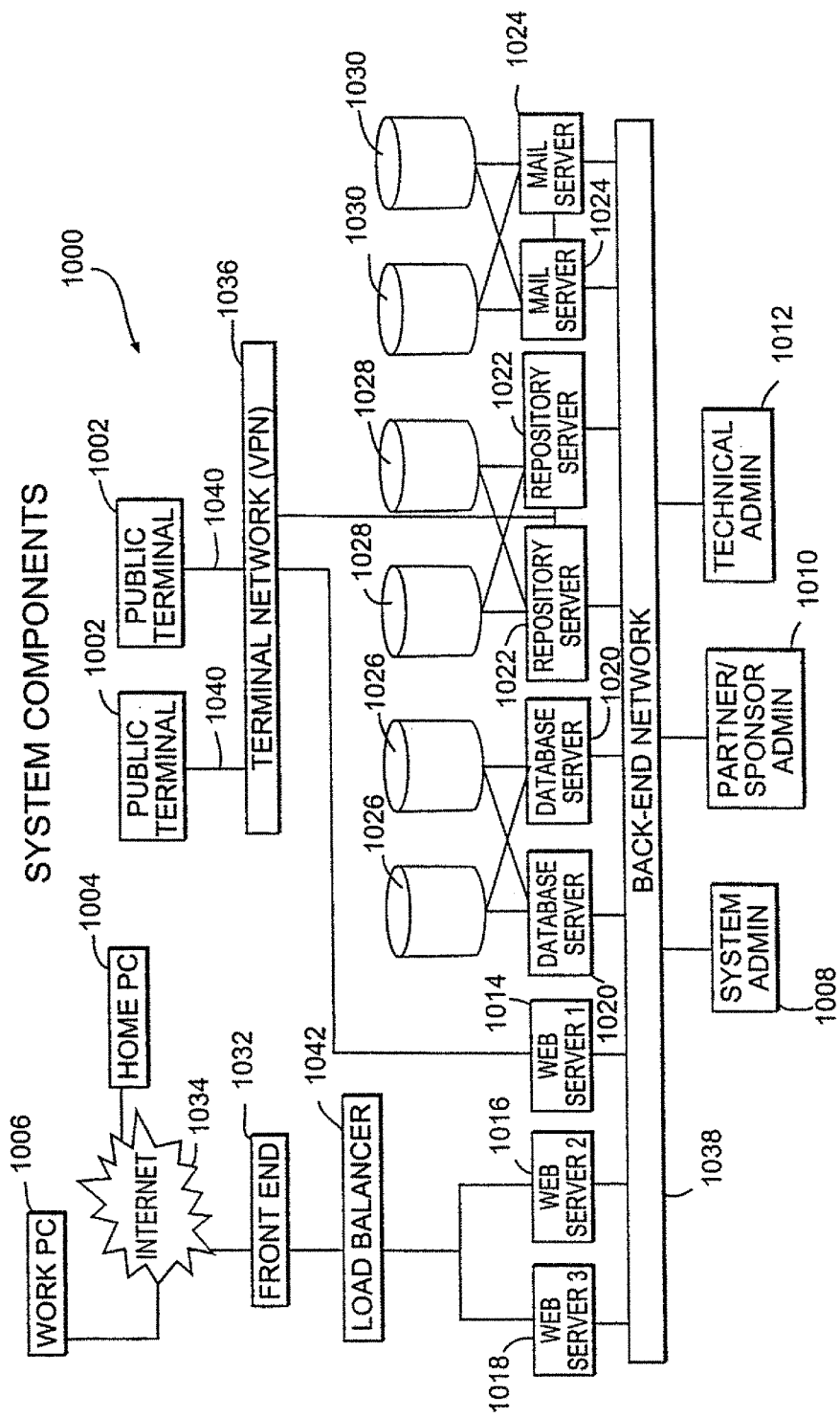
FIG. 10 illustrates a system in accordance with a preferred embodiment of the invention.

FIG. 10 illustrates a system 1000 in accordance with a preferred embodiment of the invention. Users access the system via public terminals 1002, which are conveniently placed throughout the community in public places/venues. Each terminal 1002, in the preferred embodiment as depicted in FIG. 10, is an Intel-based computer system having an active matrix, thin-film transfer (TFT) liquid crystal display (LCD), a touch screen, a hard drive, stereo speakers with amplifier, stereo headphones, access card reader (e.g., smartcard), keyboard, and Ethernet connector. The terminals consisting of other computer systems and configurations, however, can be practiced with the invention. The terminals also have content delivery software (multicast client software) (discussed below) and remote administrator software which allows a technical administrator to check status, reboot or shutdown the terminal.

Users can also access system from home or work, via their own personal computers, 1004 and 1006, respectively. Additionally, system administrators, technical administrators, partner/sponsor administrators access the system via dedicated computers, 1008, 1010, and 1012, respectively. See Appendix A of U.S. provisional application 60/160,760 for the detailed system administration, technical administration, partner/sponsor administration features of this preferred embodiment.

The system 1000 in this preferred embodiment includes Web servers (1-3) (1014, 1016 and 1018, respectively), database servers 1020, repository servers 1022, and mail servers 1024. Although this preferred embodiment uses a centralized server configuration, other configurations, such as distributed database configurations can also be practiced with the invention. Moreover as would be apparent to one of ordinary skill in the art, various numbers and types of servers, hardware, configurations, arrangements, and interfaces can be readily used.

Web servers 1-3 (1014, 1016, and 1018) support user access to the system by providing an entry point for the users and handling all interactions. In this preferred embodiment, the Web servers (1014, 1016, and 1018) are commercially available Intel Pentium-based servers with Microsoft NT operating systems. The Web servers include commercially available Active Server Pages (ASP), HyperText Markup Language (HTML), and Active-X software. The ASP and Active-X software are used to pull data from database server 1020 and mail server 1024, produce HTML pages on-the-fly, and present information to the user. The Active-X software, in the preferred embodiment, is also used to read and handle email (Post Office Protocol 3 (POP3) mail) from servers outside the system, password encryption, etc.

The database servers 1020 store all user data (e.g., user profiles, behavior information, user actions, email, contents, posting board contents, user action, behaviors, logs, etc.) In this preferred embodiment, database servers 1020 are Intel Pentium-based servers with Microsoft NT operating systems, operably connected with disk subsystems 1026 (hereinafter collectively referenced with database servers 1020) as data via an optical fiber interface. The database servers also have ANSI compliant structured query language (SQL) compliant software for accessing the databases. SQL is used in the preferred embodiment since it supports multiple user access to the database simultaneously. However, one of ordinary skill in the art would appreciate that other database software can be practiced with the invention.

The repository servers 1022 primarily store content information and run administration (system, technical, and partner/sponsor) applications. In this preferred embodiment, these servers are also Intel Pentium-based servers with Microsoft NT operating systems, operably connected with disk subsystems 1028 1026 (hereinafter collectively referenced with database servers 1022) via small computer system interfaces (SCSI). The repository servers 1022 also have commercially available ASP, HTML, and Active-X software. In addition, these servers 1022 have content delivery sore (multicast server software) (discussed below).

The mail servers 1024 store and handle all email to/from the system 1000. In this preferred embodiment, these servers 1024 are commercially available Sun servers with Solaris Unix-based operating systems, operably connected to disk subsystems 1026 (hereinafter collectively referenced with database servers 1024) via SCSI. The mail servers 1024 also have sendmail, mail delivery agent, and mail filter software (discussed below).

For data protection, the database 1020, repository 1022, and mail servers 1024 are each configured in a mirror arrangement. However, other data protection configurations can be used, including various Redundant Array of Independent Disk (RAID) levels.

In the preferred embodiment, the system 1000 includes three networks. A front-end network 1032 provides a connection with the public Internet 1034 for home and work access. A terminal network 1036 provides a connection to the public terminals 1002. In this preferred embodiment, the terminal network 1036 is a Virtual Private Network (VPN), which allow efficient control, access and content transfers to the geographically dispersed terminals. Finally, a back-end network 1038 provides connection for system, technical, partner/sponsor administrators and other authorized personal accesses via terminals 1008, 1010, and 1012. As would be apparent to one of ordinary skill in the arts other network arrangements can be practiced with invention. In addition, although the preferred embodiment has been described in terms of wired technology, optical, wireless, broadband, and/or hybrid communication technology can be additionally practiced with the invention.

Each terminal 1002 is interfaced with the terminal network 1036 via a high speed Digital Subscriber Line (DSL) 1040. However, other interconnections can be used, such as dedicated T-1 lines (sometimes referred to as DS1 lines). Web server 1 1014 also directly interfaces with the terminal network 1036, as does the database servers 1020, repository servers 1022, and mail servers 1024. The database 1020, repository 1022, and mail 1024 servers are also interfaced with the back-end network 1038. Web servers 2 and 3 (1016 and 1018) also interface with the back-end network 1038 as well as a load balancer/router 1042. The load balancer/router 1042, in turn, interfaces with the public Internet 1034. In another preferred embodiment, a second load balancer/router is included in the system between the terminal network 1036 and the Web servers 1-3 (1014, 1016, and 1018). This second load balancer/router distributes the load of traffic (terminal traffic) uniformly among the Web servers (1014, 1016, and 1018).

Figure 11:
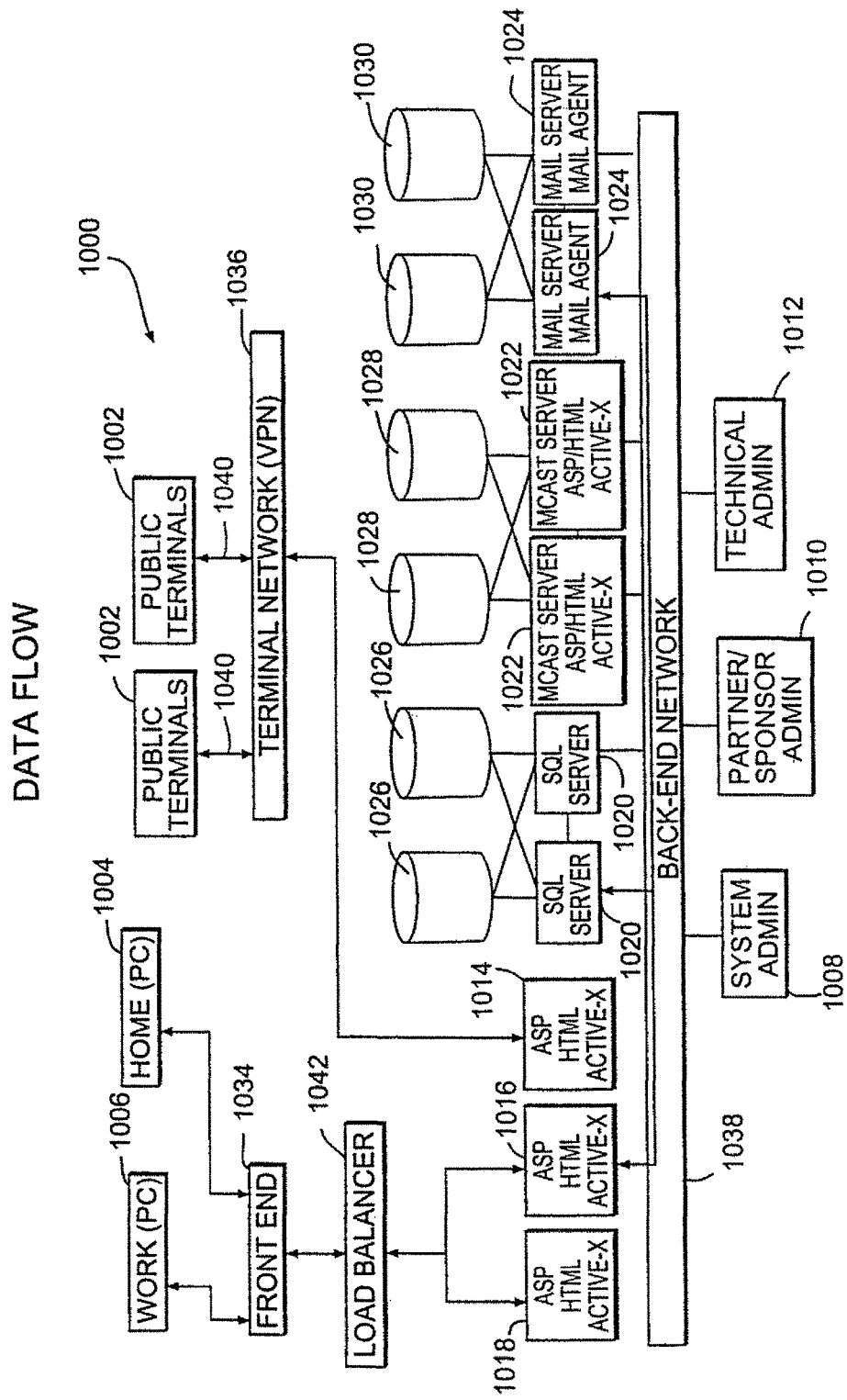
FIG. 11 illustrates the normal data flow paths.

All communication between the terminals and home/work personal computer is conducted through the Web servers using the Internet Protocol (IP). FIG. 11 illustrates the normal data flow paths. In addition to the IP, this preferred embodiment uses Terminal Machine Access Code (MAC) Address (TMCA) to identify each terminal 1002 for additional security. Each terminal 1002 has its TMCA stored one its hard drive. When the terminal 1002 contacts the Web server 1014, it provides TMCA as a proof that it is a valid terminal. The Web server 1014 validates this terminal 1002 by checking the received TMCA with information stored in on the database server 1020.

Figure 12:
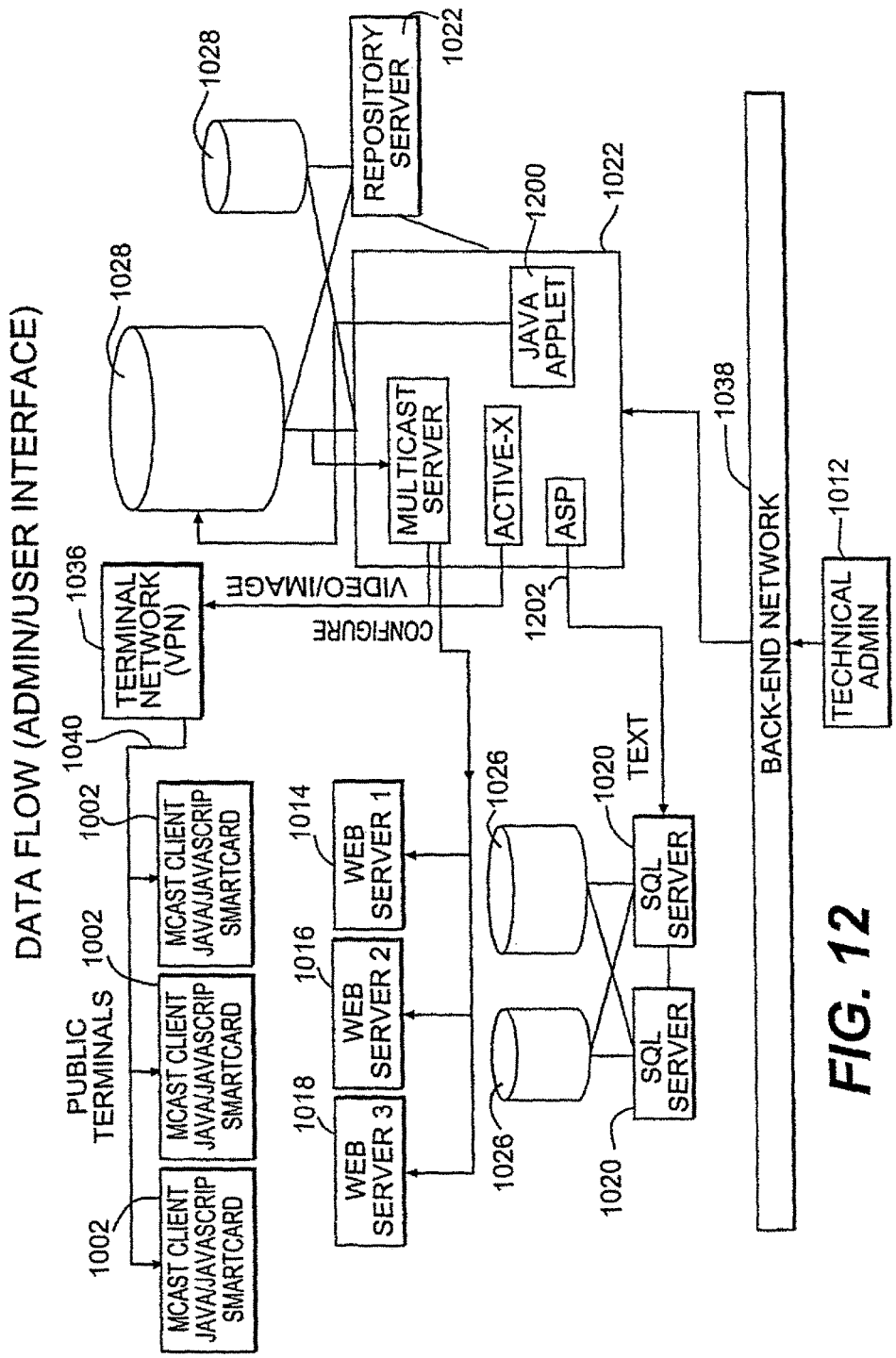
FIG. 12 illustrates the data flow of uploading new content.

FIG. 12 illustrates the data flow of uploading new content to the system 1000. Uploading new content, for example a movie trailer, can be done by the system administrator. The video is routed to and stored in the repository servers 1022 by a Java Applet 1200 and associated text 1202 is routed to and stored on the database servers 1020.

In this preferred embodiment, the system 1000 provides simultaneous transfers of new content media to each terminal 1002 and Web servers (1014, 1016, and 1018) using a multicast program/technique. Thus, the system 1000 needs to send new content only once, and all terminals 1002 and Web servers (1014, 1016, and 1018) can receive the new content from the same transmission and at the same time. Accordingly, the system 1000 does not need perform inefficient processes such as opening multiple connections to access the terminals and Web servers (1014, 1016, and 1018). Moreover, multiple content files can be sent in a single multicast session.

Figure 13:
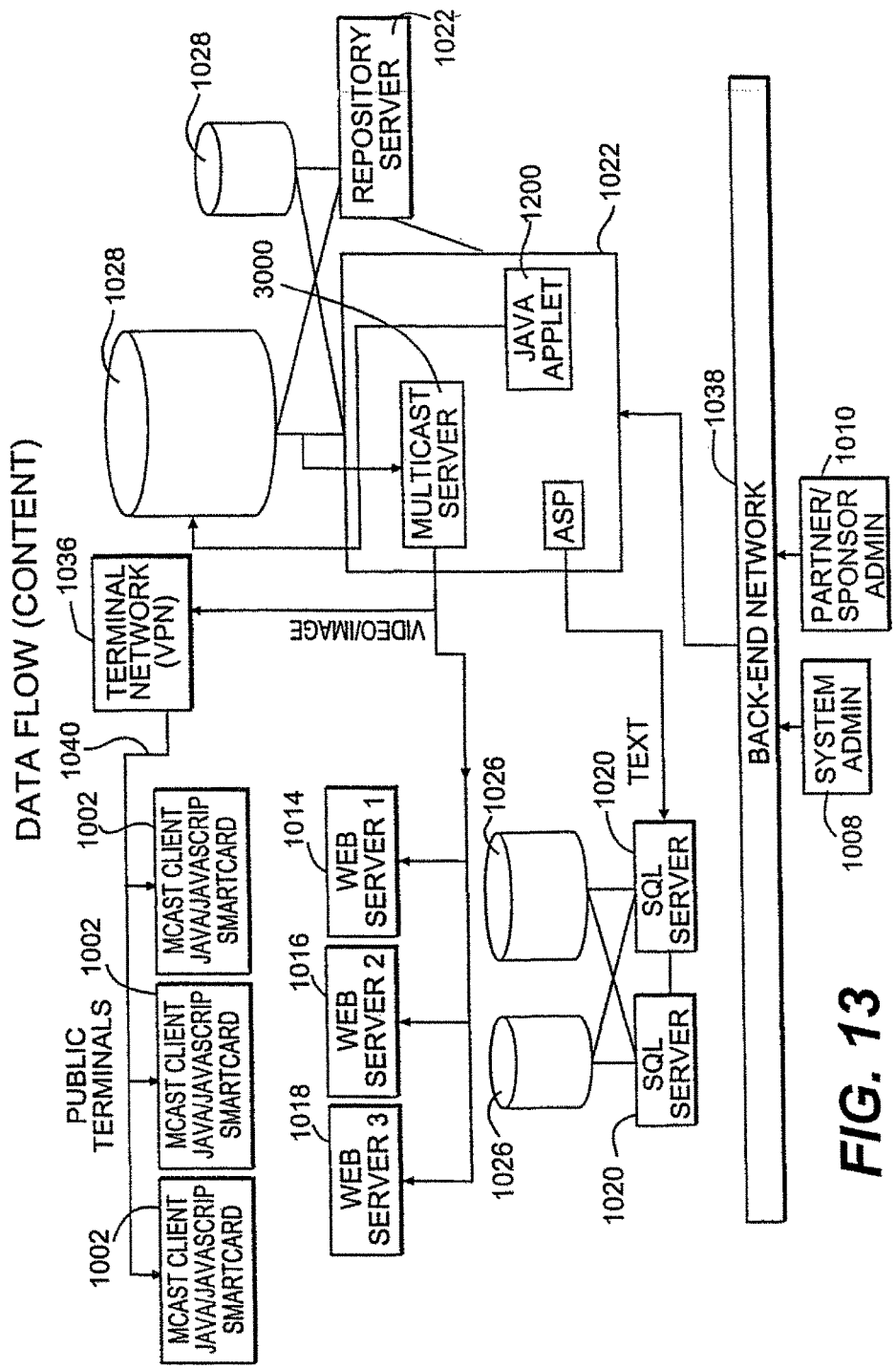
FIG. 13 illustrates the data flow of content using multicast delivery software.

FIG. 13 illustrates the data flow of content in the system using the multicast delivery software 3000. A multicast session on the repository servers 1022 can be initiated by either the system or technical administrator in this preferred embodiment. The multicast software 3000 polls the database server 1020 to check whether a multicast session has been created and due to run. Whenever a session is due to run, it collects list (maintained on the database server 1020) of active Web servers (1014, 1016, and 1018) and terminals 1002 (collectively clients) from the database servers 1020 and inform clients about the forthcoming multicast session using TCP/IP. All active Web servers (1014, 1016, and 1018) and terminals 1002 then listen to the designated port for the arrival of the new content. The multicast software 3000 then creates data packets and sends the data to the Web servers (1014, 1016, and 1018) and terminals 1002. Once the content has been sent, terminal users can access the content directly from the terminal's 1002 hard drive and home or work users can access the content on the Web server (1014, 1016, and 1018). If some Web servers (1014, 1016, and 1018) or terminals 1002 fail to receive all or part of the content data, a re-send operation is performed.

Figure 14:
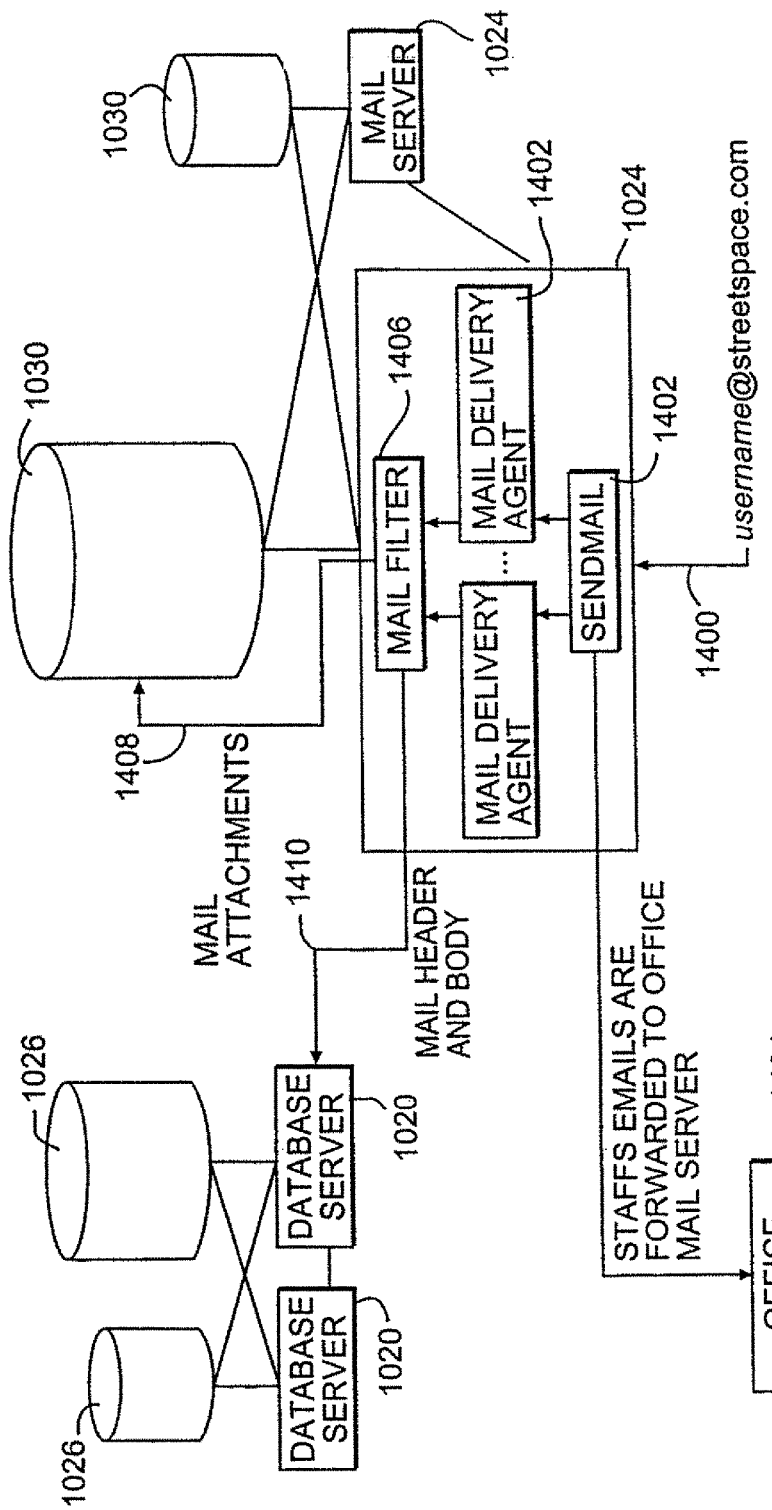
FIG. 14 illustrates the data flow of incoming emails.

FIG. 14 illustrates the data flow of incoming emails. As noted above, the mail server 1024 handles all emails from/to the Internet 1034. For incoming email 1400, the sendmail process 1402, a Simple Mail Transfer Protocol (SMTP) mail daemon, receives email from the Internet 1034 and passes the email to a mail agent 1402 for delivery. User and staff member emails are distinguished and segregated at this point. The sendmail process 1402 sends staff member email to a main office mail server 1404 and sends user emails to the mail delivery agent process. The mail server 1024 starts a new delivery agent 1402 for every incoming email. The mail delivery agent 1402 passes along the email of valid users for filtering and storage. A mail filter 1406 process removes attachments and links to the outside Internet 1034 and sends the mail header and body (text) 1410 to the database server 1020 for storage and sends the email attachments 1408 to the mail server 1024 for storage. Users retrieve emails upon accessing the system.

Figure 15:
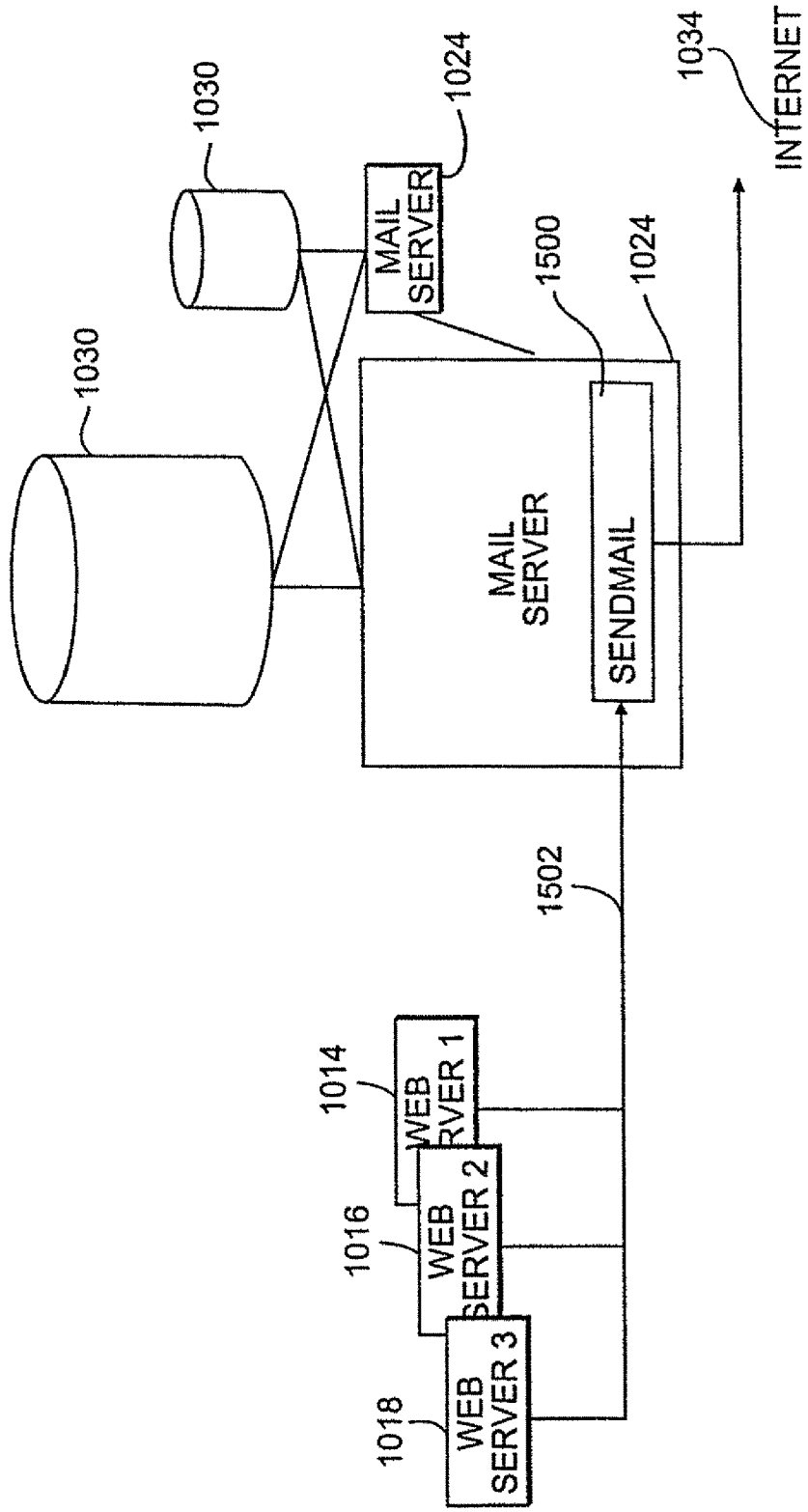
FIG. 15 illustrates the data flow outgoing emails.

FIG. 15 illustrates the data flow outgoing emails. For outgoing emails, a sendmail 1500 process accepts emails 1502 from Web servers 1-3 (1014, 1016, and 1018) for delivery to the Internet 1034. The sendmail 1500 process provides functions such as checking the validity of the email address and the existence of the domain name as well as sending the email over the Internet.

Tables 1-2 illustrate the database fields for the user profile and user history information in accordance with this preferred embodiment of the invention. As would be apparent to one of ordinary skilled in the art, the invention can be practiced with any number and type of database fields, profiles, indices, lists, other database information and files and that the invention is not limited to those delineated below.

TABLE 1

(User Profile Fields)

| Field Name | Description |
| --- | --- |
| ACC | User ID |
| GENDER | Gender |
| YOB | Year of birth |
| ZIP | Zip code |
| SIG | Signature text (for outgoing mails) |
| REWARDS | Total accumulated rewards for current month |
| PSTYLE | Personal style ID |
| QUOTA | Mail quota (bytes) |
| RDATE | Date of last login |

TABLE 1-continued (User Profile Fields)

| Field Name | Description |
| --- | --- |
| FN | Online name |
| SA | State ID |
| CITY | City ID |
| ST | State ID |
| CNTRY | Country ID |
| NOLOGIN | Number of total login |
| REGDATE | Date of registration |
| TMCA | Terminal registered from |
| AUTHO | Authorization for instant notes |
| NOJOKE | Status |

TABLE 2

(User History Fields)

| Field Name | Description |
| --- | --- |
| BID | Behavior ID |
| ACCT | Owner's ID |
| SLEN | Average session length (in seconds) |
| USINCE | User since (this date) |
| NOLOGIN | Total number of login |
| TSLOT1 | Total number of login between midnight to 4:00AM |
| TSLOT2 | Total number of login between 4:00AM to 7:59AM |
| TSLOT3 | Total number of login between 8:00AM to 11:59AM |
| TSLOT4 | Total number of login between 12:00NOON to 3:59PM |
| TSLOT5 | Total number of login between 4:00PM to 7:59PM |
| TSLOT6 | Total number of login between 8:00PM to 11:59PM |

Although the invention has been particularly shown and described with reference to several preferred embodiments thereof, it will be understood by those skilled in the art that various changes in form and details may be made therein without departing from the spirit and scope of the invention as defined in the appended claims. For example, the invention can be practiced in conjunction with a corporate intranet or with broadcast media, thin-client information retrieval systems in which devices such as personal digital assistants, palm-top computers or automotive on-board computers are used to accesses a system in accordance with the invention.

What is claimed is:

1. A system for providing a network users with information unique to a local neighborhood of a public access terminal within a secure network of public access terminals, the system comprising:

a secure network of public access terminals, wherein each public access terminal has a unique identification code, a touch screen, and an access card reader, wherein the secure network of public access terminals is accessible to a user via a user login and user access card, the access card reader activates a public access terminal via the user access card, and the touch screen comprises a user interface for the user to use a public access terminal;

a first user access card comprising a unique identifier code associated with a first user, wherein the first user access card activates any public access terminal within the secure network of public access terminals;

a database comprising a unique identification code associated with each public access terminal within said secure network of public access terminals, wherein each unique identification code is associated with a unique permanent, fixed physical location of a respective public access terminal;

a repository server comprising a plurality of pieces of local content information, each piece of local content information is unique to a local neighborhood of each public access terminal; and a web server operably connected to the network of public access terminals, the web server activating a first public access terminal when the first public access terminal processes the unique identifier code of the first user access card via its access card reader and selecting and providing a first piece of local content information from said plurality of pieces of local content information to said first public access terminal based on the unique identification code of the first public access terminal and enabling said first user to interact via email or instant notes with a second user using a second public access terminal within the network of public access terminals, wherein the first piece of local content information comprises an advertisement;

wherein said piece of local content information is associated with a first physical location and said web server provides said at least one piece of content information to said first public access terminal when said first physical location corresponds to a physical location of said terminal or a geographic address entered at said terminal and the unique identification code of the first public access terminal.

\* \* \* \* \*